US012567168B2

(12) United States Patent
Liu et al.

(10) Patent No.: US 12,567,168 B2
(45) Date of Patent: Mar. 3, 2026

(54) DATA PROCESSING METHOD AND APPARATUS, DEVICE, AND READABLE STORAGE MEDIUM

(71) Applicant: TENCENT TECHNOLOGY (SHENZHEN) COMPANY LIMITED, Shenzhen (CN)

(72) Inventors: Haiyang Liu, Shenzhen (CN); Minhua Xu, Shenzhen (CN); Wei Gao, Shenzhen (CN); Ruipeng Cao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 326 days.

(21) Appl. No.: 18/196,364

(22) Filed: May 11, 2023

(65) Prior Publication Data

US 2023/0281861 A1    Sep. 7, 2023

Related U.S. Application Data

(63) Continuation of application No. PCT/CN2022/112398, filed on Aug. 15, 2022.

(30) Foreign Application Priority Data

Sep. 24, 2021    (CN) .......................... 202111123508.7

(51) Int. Cl.
G06K 9/00    (2022.01)
G06T 5/50    (2006.01)
(Continued)

(52) U.S. Cl.
CPC .................. G06T 7/70 (2017.01); G06T 5/50 (2013.01); G06T 7/13 (2017.01); G06T 9/00 (2013.01);
(Continued)

(58) Field of Classification Search
None
See application file for complete search history.

(56) References Cited

U.S. PATENT DOCUMENTS

2013/0147819 A1    6/2013    Dharmapurikar
2014/0292786 A1    10/2014    Keslin
(Continued)

FOREIGN PATENT DOCUMENTS

CA          3126760 A1 *   8/2020    ............. G06T 9/001
CN          103294439 A     9/2013
(Continued)

OTHER PUBLICATIONS

The European Patent Office (EPO) the Extended European Search Report for Application No. 22871677.5 Nov. 5, 2024 13 Pages.
(Continued)

*Primary Examiner* — Wei Wen Yang
(74) *Attorney, Agent, or Firm* — Anova Law Group, PLLC

(57) ABSTRACT

A data processing method includes: receiving first image data transmitted by a first client, and storing the first image data to a receive queue, the first image data being obtained by the first client during running of a cloud application and includes an object; performing image recognition processing on the first image data in the receive queue, and storing, to the receive queue during image recognition processing of the first image data, second image data obtained and transmitted by the first client, to obtain an updated receive queue; and transmitting, when a first object region containing the object in the first image data is extracted through image recognition processing, first object image data in the first object region to a target cloud application server, and
(Continued)

simultaneously performing image recognition processing on the second image data with a latest receiving timestamp in the updated receive queue.

20 Claims, 13 Drawing Sheets

(51) Int. Cl.

| | | |
|---|---|---|
| *G06T 7/13* | (2017.01) | |
| *G06T 7/70* | (2017.01) | |
| *G06T 9/00* | (2006.01) | |
| *G06V 10/25* | (2022.01) | |
| *G06V 10/44* | (2022.01) | |

(52) U.S. Cl.
CPC ............ *G06V 10/25* (2022.01); *G06V 10/457* (2022.01); *G06T 2207/20221* (2013.01)

(56) References Cited

U.S. PATENT DOCUMENTS

| | | |
|---|---|---|
| 2016/0012640 A1 | 1/2016 | Abraham |
| 2018/0047205 A1 | 2/2018 | Ai |
| 2020/0094138 A1 | 3/2020 | Chen |
| 2020/0374242 A1 | 11/2020 | Xu et al. |
| 2020/0380745 A1 | 12/2020 | Bhiravabhatla et al. |
| 2022/0038529 A1 | 2/2022 | Wang et al. |
| 2022/0054940 A1 | 2/2022 | Smullen et al. |
| 2022/0355204 A1 | 11/2022 | Liang et al. |
| 2023/0032554 A1 | 2/2023 | Ren et al. |

FOREIGN PATENT DOCUMENTS

| | | |
|---|---|---|
| CN | 108810554 A | 11/2018 |
| CN | 111729293 A | 10/2020 |
| CN | 111767503 A | 10/2020 |
| CN | 111818115 A | 10/2020 |
| CN | 112316424 A | 2/2021 |
| CN | 112689142 A | 4/2021 |
| CN | 113559497 A | 10/2021 |
| EP | 3634005 A1 | 4/2020 |
| EP | 3700640 A1 | 9/2020 |
| JP | 2009171994 A | 8/2009 |
| WO | WO-2020226979 A2 * | 11/2020 ............ G06F 1/206 |

OTHER PUBLICATIONS

Chauhan Parul C et al: "2D basic shape detection and recognition using hybrid neuro-fuzzy techniques: A survey", 2015 International Conference on Electrical, Electronics, Signals, Communication and Optimization (EESCO), IEEE, Jan. 24, 2015 (Jan. 24, 2015), pp. 1-5.

The Japan Patent Office (JPO) Notice of Reasons for Refusal for Application No. 2023-555773 Oct. 22, 2024 7 Pages (including translation).

China National Intellectual Property Administration (CNIPA) Office Action 1 for 20211123508.7 Nov. 10, 2021 10 Pages (including translation).

The World Intellectual Property Organization (WIPO) International Search Report for PCT/CN2022/112398 Nov. 19, 2022 13 Pages (including translation).

Chen"Information Technology Series of China Excellent Master's Thesis Full Text Database (electronic journal) vol. 2019, Issue 1" "Research on Distributed Server Architecture Applied to Virtual Reality", Jan. 15, 2019 (Jan. 15, 2019).

Wang"Information Technology Series of China Excellent Master's Thesis Full Text Database (electronic journal) vol. 2020, Issue 7" "Research and Optimization of Spice Protocol in Virtual Desktop Architecture of Cloud Platform", Jul. 15, 2020 (Jul. 15, 2020).

Chen et al. "2017 IEEE International Conference on Multimedia & Expo Workshops (ICMEW)" "Distributed rendering:Interaction delayreduction in remoterendering with client-end GPU-accelerated scene warping technique", Sep. 7, 2017 (Sep. 7, 2017).

Viitanen et al. "2018 IEEE 38th International Conference on Distributed Computing Systems (ICDC5)" "Low Latency Edge Rendering Scheme for Interactive 360 Degree Virtual Reality Gaming", Jul. 23, 2018 (Jul. 23, 2018).

* cited by examiner

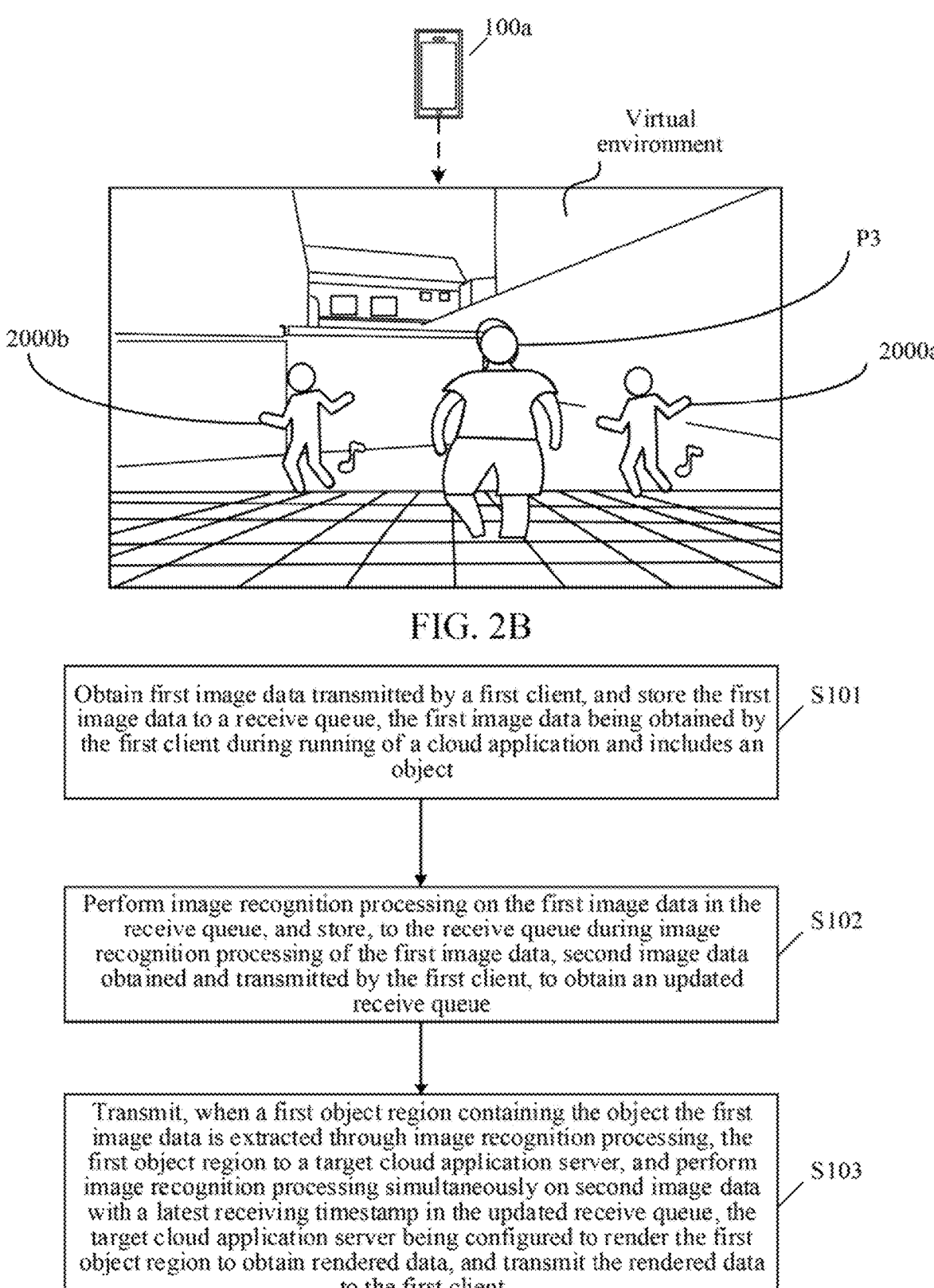

FIG. 2B

Obtain first image data transmitted by a first client, and store the first image data to a receive queue, the first image data being obtained by the first client during running of a cloud application and includes an object — S101

Perform image recognition processing on the first image data in the receive queue, and store, to the receive queue during image recognition processing of the first image data, second image data obtained and transmitted by the first client, to obtain an updated receive queue — S102

Transmit, when a first object region containing the object the first image data is extracted through image recognition processing, the first object region to a target cloud application server, and perform image recognition processing simultaneously on second image data with a latest receiving timestamp in the updated receive queue, the target cloud application server being configured to render the first object region to obtain rendered data, and transmit the rendered data to the first client — S103

FIG. 3

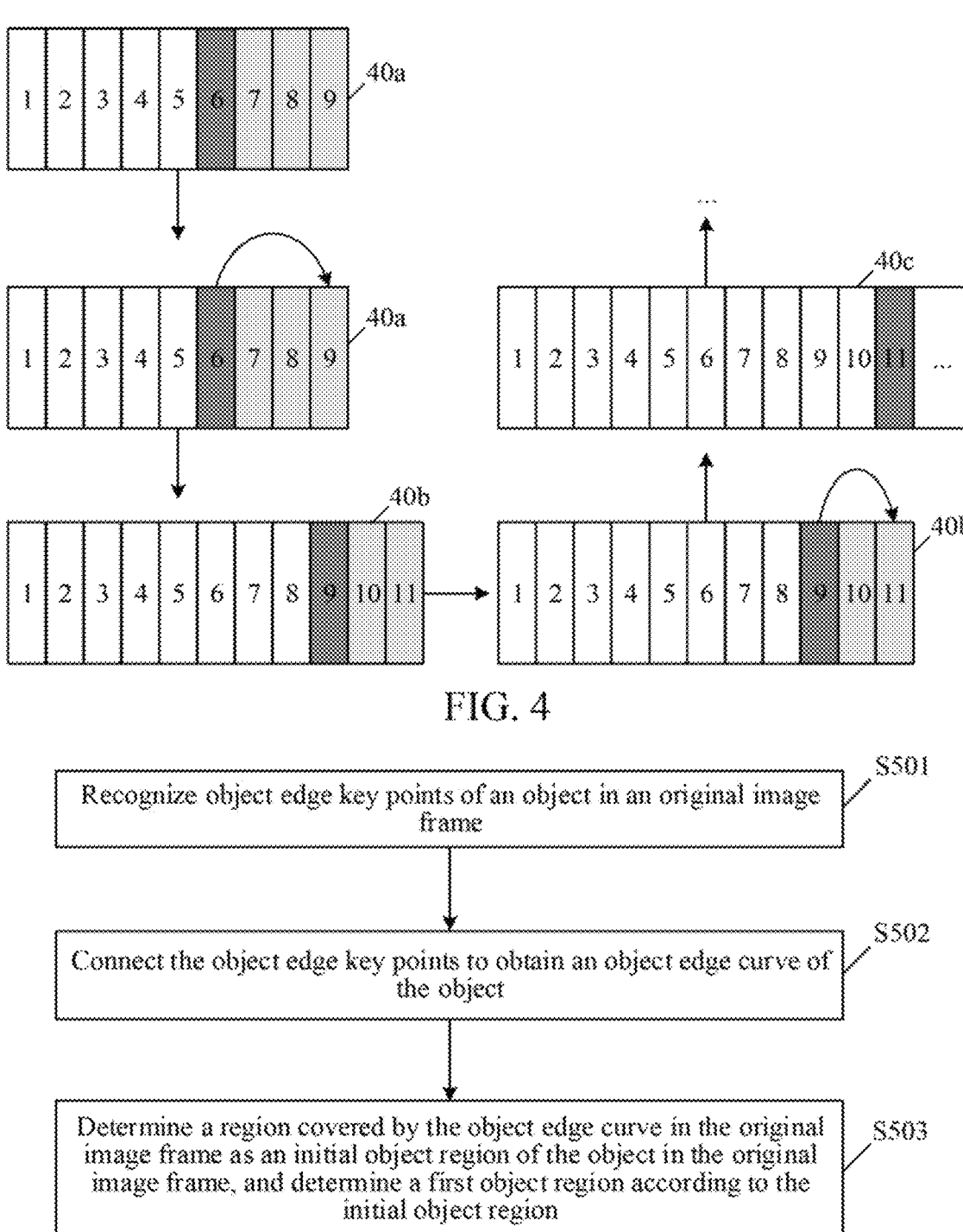

FIG. 4

S501
Recognize object edge key points of an object in an original image frame

S502
Connect the object edge key points to obtain an object edge curve of the object S503
Determine a region covered by the object edge curve in the original image frame as an initial object region of the object in the original image frame, and determine a first object region according to the initial object region

FIG. 5

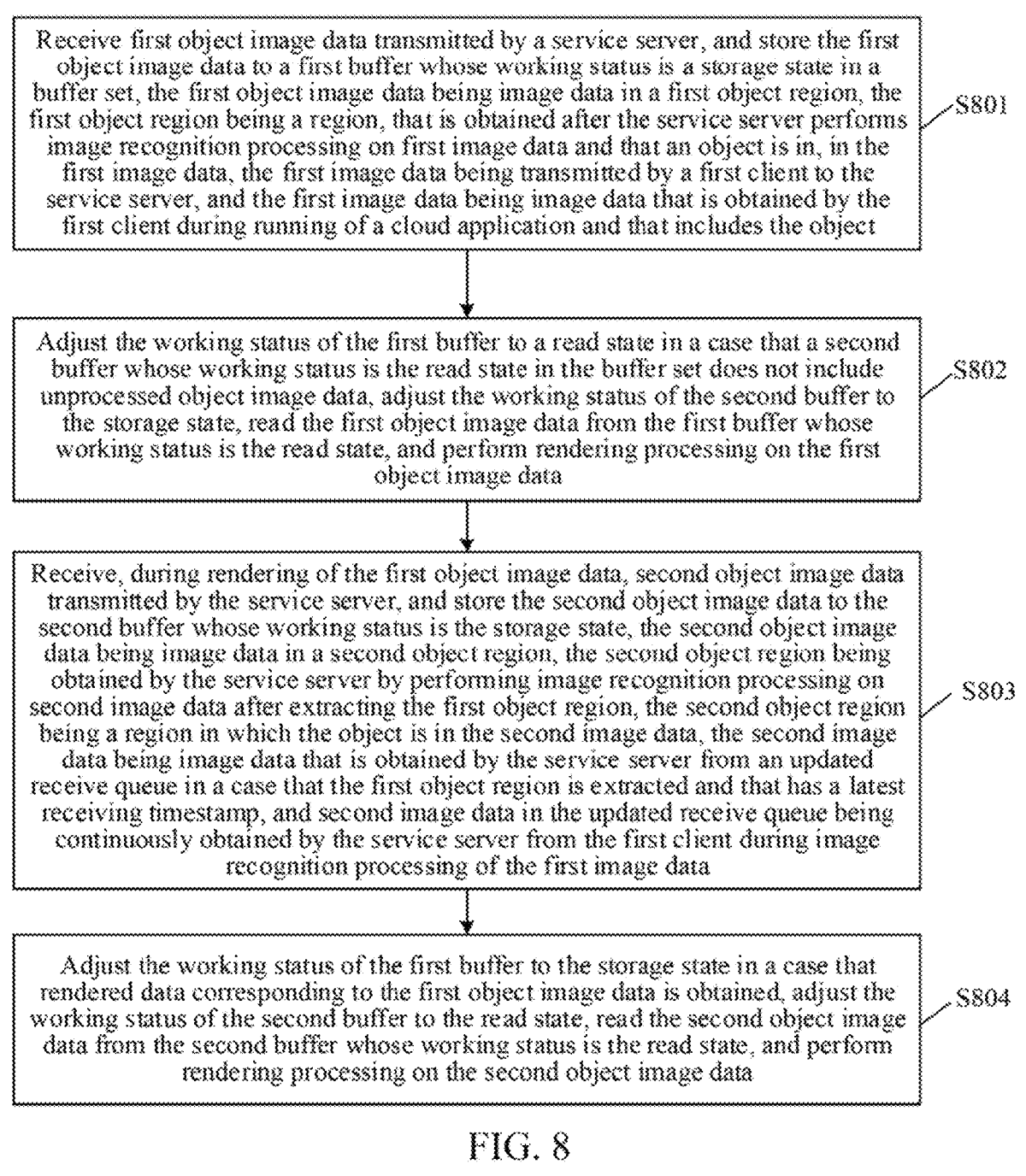

Receive first object image data transmitted by a service server, and store the first object image data to a first buffer whose working status is a storage state in a buffer set, the first object image data being image data in a first object region, the first object region being a region, that is obtained after the service server performs image recognition processing on first image data and that an object is in, in the first image data, the first image data being transmitted by a first client to the service server, and the first image data being image data that is obtained by the first client during running of a cloud application and that includes the object
— S801

Adjust the working status of the first buffer to a read state in a case that a second buffer whose working status is the read state in the buffer set does not include unprocessed object image data, adjust the working status of the second buffer to the storage state, read the first object image data from the first buffer whose working status is the read state, and perform rendering processing on the first object image data
— S802

Receive, during rendering of the first object image data, second object image data transmitted by the service server, and store the second object image data to the second buffer whose working status is the storage state, the second object image data being image data in a second object region, the second object region being obtained by the service server by performing image recognition processing on second image data after extracting the first object region, the second object region being a region in which the object is in the second image data, the second image data being image data that is obtained by the service server from an updated receive queue in a case that the first object region is extracted and that has a latest receiving timestamp, and second image data in the updated receive queue being continuously obtained by the service server from the first client during image recognition processing of the first image data
— S803

Adjust the working status of the first buffer to the storage state in a case that rendered data corresponding to the first object image data is obtained, adjust the working status of the second buffer to the read state, read the second object image data from the second buffer whose working status is the read state, and perform rendering processing on the second object image data
— S804

FIG. 8

DATA PROCESSING METHOD AND APPARATUS, DEVICE, AND READABLE STORAGE MEDIUM

CROSS-REFERENCES TO RELATED APPLICATIONS

This application is a continuation application of PCT Patent Application No. PCT/CN2022/112398, entitled "DATA PROCESSING METHOD AND APPARATUS, AND DEVICE AND READABLE STORAGE MEDIUM" and filed on Aug. 15, 2022, which claims priority to Chinese Patent Application No. 202111123508.7, entitled "DATA PROCESSING METHOD AND APPARATUS, DEVICE, AND READABLE STORAGE MEDIUM" filed with the China National Intellectual Property Administration on Sep. 24, 2021, the entire contents of both of which are incorporated herein by reference.

FIELD OF THE TECHNOLOGY

The present disclosure relates to the field of computer technologies, and in particular, to a data processing method and apparatus, a device, and a readable storage medium.

BACKGROUND OF THE DISCLOSURE

With rapid development of technologies related to electronic devices and popularization of the Internet, the game industry existing and operating depending on electronic devices has been developed by leaps and bounds. Especially after emergence of smart terminals such as smart phones and tablet computers, a development potential of the game industry has become more prominent.

In order to provide a user with an immersive experience, a corresponding virtual object (for example, a virtual animation object) may be created in a cloud game according to a human body image of the user, and the virtual object is displayed in the cloud game. That is, the user may be placed in a virtual cloud game scenario by using the virtual object, so as to provide the user with the immersive experience in the cloud game. In general, in this process, after a terminal acquires a user picture by using a camera, a portrait of the user is directly recognized and extracted on the terminal, thereby obtaining and displaying the corresponding virtual object.

Since a computing capability of the terminal is not so high, it is very likely to bring low image recognition efficiency by the insufficient computing capability, further leading to a long delay in a process in which the terminal transmits a portrait recognition result to a cloud. As a result, there is a delay when the virtual object is displayed in the game, and a virtual behavior of the virtual object displayed in the game does not match a current behavior status of the user.

SUMMARY

Embodiments of the present disclosure provide a data processing method and apparatus, a device, and a readable storage medium, which may reduce an image transmission delay and improve image recognition efficiency.

An aspect of the embodiments of the present disclosure provides a data processing method. The method is performed by a computer device. The method includes: receiving first image data transmitted by a first client, and storing the first image data to a receive queue, the first image data being obtained by the first client during running of a cloud application and includes an object; performing image recognition processing on the first image data in the receive queue, and storing, to the receive queue during image recognition processing of the first image data, second image data obtained and transmitted by the first client, to obtain an updated receive queue; and transmitting, when a first object region containing the object in the first image data is extracted through image recognition processing, first object image data in the first object region to a target cloud application server, and simultaneously performing image recognition processing on the second image data with a latest receiving timestamp in the updated receive queue, the target cloud application server being configured to render the first object image data to obtain rendered data, and transmit the rendered data to the first client.

Another aspect of the embodiments of the present disclosure provides a data processing method. The method is performed by a computer device. The method includes: receiving first object image data transmitted by a service server, and storing the first object image data to a first buffer whose working status is a storage state in a buffer set, the first object image data of a first object region containing an object, the first object region being obtained after the service server performs image recognition processing on first image data, the first image data being transmitted by a first client to the service server, and the first image data being obtained by the first client during running of a cloud application and that includes the object; adjusting the working status of the first buffer to a read state when a second buffer whose working status is the read state in the buffer set does not include unprocessed object image data, adjusting the working status of the second buffer to the storage state, reading the first object image data from the first buffer whose working status is the read state, and performing rendering processing on the first object image data; receiving, during rendering of the first object region, second object image data transmitted by the service server, and storing the second object image data to the second buffer whose working status is the storage state, the second object image data being image data in a second object region, the second object region being obtained by the service server by performing image recognition processing on second image data after extracting the first object region, the second object region in the second image data contains the object, the second image data being obtained by the service server from an updated receive queue when the first object region is extracted and that has a latest receiving timestamp, and second image data in the updated receive queue being obtained by the service server from the first client during image recognition processing of the first image data; and adjusting the working status of the first buffer to the storage state when rendered data corresponding to the first object image data is obtained, adjusting the working status of the second buffer to the read state, reading the second object image data from the second buffer whose working status is the read state, and performing rendering processing on the second object image data.

An aspect of the embodiments of the present disclosure provides a computer device, including at least one processor and at least one memory. The memory stores a computer program. When the computer program is executed by the processor, the processor performs the method in the embodiments of the present disclosure.

An aspect of the embodiments of the present disclosure provides a non-transitory computer-readable storage medium. The computer-readable storage medium stores a computer program. The computer program includes program instructions. The program instructions are executed by a processor to perform the method in the embodiments of the present disclosure.

In the embodiment of the present disclosure, when obtaining the first image data including the object, a client (for example, the first client) may transmit the first image data to a related computer device (for example, the service server), the service server performs image recognition processing, and the client is not required to perform image recognition locally. In this way, image recognition processing may be performed on the first image data by using the service server with a high computing capability, so that image recognition efficiency and a definition may be improved. In addition, in the present disclosure, the service server may store the received first image data to the receive queue, continuously obtain the second image data synchronously from the first client during image recognition processing of the first image data, and store the second image data to the receive queue to obtain the updated receive queue. That is, in the present disclosure, the service server does not stop receiving the second image data during image recognition processing of the first image data, and may implement image processing and image reception synchronously by using the receive queue. In this way, an image transmission delay may be reduced. Further, when the service server extracts, through image recognition processing, the first object region in which the object is in the first image data, the service server may transmit the first object image data in the first object region to the target cloud application server, and the target cloud application server performs rendering, and transmits the rendered data obtained through rendering to the first client. In this way, displaying may be performed in the cloud application. In addition, after extracting the first object region, the service server may obtain the second image data with the latest receiving timestamp in the receive queue, and continue to process the second image data. It can be seen that in the present disclosure, image data is not recognized one by one according to a time sequence of receiving timestamps, and instead, image data with a latest receiving timestamp is obtained from the receive queue for processing after image recognition processing is performed on specific image data, so that image data recognition efficiency may be improved. In addition, since the image data with the latest receiving timestamp is acquired according to a current behavior of the object, when image recognition and displaying are performed on the image data with the latest receiving timestamp, the current behavior of the object is matched. In summary, according to the present disclosure, the image recognition efficiency may be improved, the image transmission delay may be reduced, and it may be ensured that a virtual behavior of a virtual object displayed in the cloud application matches a current behavior status of the object.

BRIEF DESCRIPTION OF THE DRAWINGS

In order to describe the technical solutions in the embodiments of the present disclosure or the related art more clearly, the drawings required to be used in descriptions about the embodiments or the related art will be introduced briefly below. Apparently, the drawings in the descriptions below are merely some embodiments of the present disclosure. A person of ordinary skill in the art may further obtain other drawings according to these drawings without creative work.

FIG. 2b is a schematic diagram of a scenario according to an embodiment of the present disclosure.

FIG. 3 is a schematic flowchart of a data processing method according to an embodiment of the present disclosure.

FIG. 4 is a schematic diagram of frame skipping processing according to an embodiment of the present disclosure.

FIG. 5 is a schematic flowchart of a data processing method according to an embodiment of the present disclosure.

FIG. 8 is a schematic flowchart of a data processing method according to an embodiment of the present disclosure.

DESCRIPTION OF EMBODIMENTS

The technical solutions in the embodiments of the present disclosure will be described clearly and completely below with reference to the accompanying drawings in the embodiments of the present disclosure. Clearly, the described embodiments are not all but merely some embodiments of the present disclosure. All other embodiments obtained by a person of ordinary skill in the art based on the embodiments of the present disclosure without creative work shall fall within the protection scope of the present disclosure.

Figure 1:
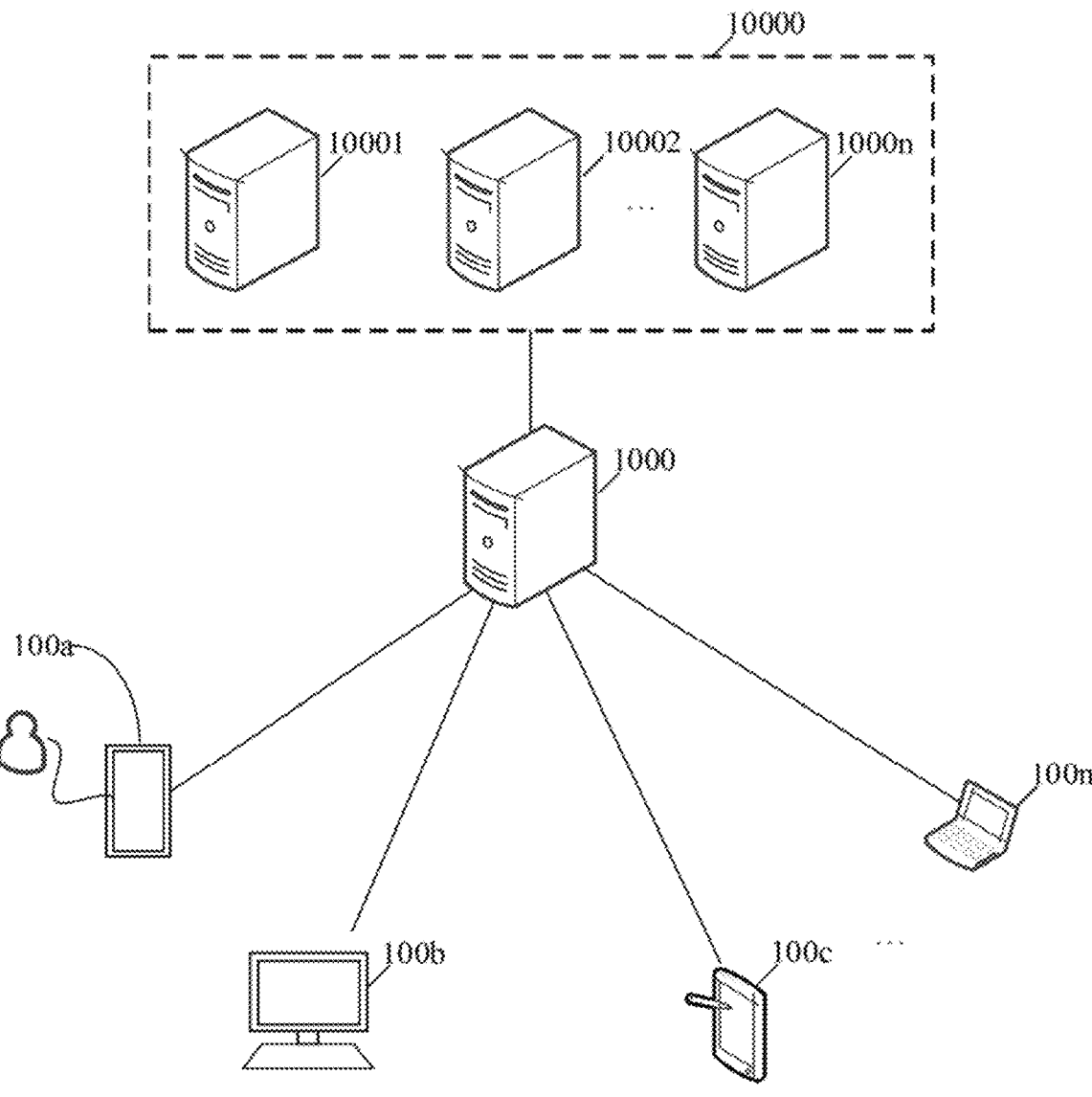
FIG. 1 is a diagram of a network architecture according to an embodiment of the present disclosure.

Refer to FIG. 1. FIG. 1 is a diagram of a network architecture according to an embodiment of the present disclosure. As shown in FIG. 1, the network architecture may include a service server 1000, a terminal device cluster, and a cloud application server cluster 10000. The terminal device cluster may include one or more terminal devices. A quantity of terminal devices is not limited herein. As shown in FIG. 1, a plurality of terminal devices may include a terminal device 100a, a terminal device 100b, a terminal device 100c, . . . , and a terminal device 100n. As shown in FIG. 1, each of the terminal device 100a, the terminal device 100b, the terminal device 100c, . . . , and the terminal device 100n may establish a network connection with the service server 1000, such that each terminal device may perform data interaction with the service server 1000 through the network connection. The cloud application server cluster 10000 may include one or more cloud application servers. A quantity of cloud application servers is not limited herein. As shown in FIG. 1, a plurality of cloud application servers may include a cloud application server 10001, a cloud application server 10002, . . . , and a cloud application server 1000*n*. As shown in FIG. 1, each of the cloud application server 10001, the cloud application server 10002, . . . , and the cloud application server 1000*n* may establish a network connection with the service server 1000, such that each cloud application server may perform data interaction with the service server 1000 through the network connection. Each cloud application server may be a cloud application server. One terminal device may correspond to one cloud application server (a plurality of terminal devices may correspond to a same cloud application server). When the terminal device runs a cloud application, the corresponding cloud application server provides a corresponding function service (for example, a computing service) for the terminal device. For example, when the cloud application is a cloud game application, the cloud application server may be a cloud game server. When the terminal device runs the cloud game application, the corresponding cloud game server provides a corresponding function service for the terminal device.

It may be understood that each terminal device shown in FIG. 1 may be installed with the cloud application, and when the cloud application is run in each terminal device, may perform data interaction with the service server 1000 shown in FIG. 1, such that the service server 1000 may receive service data from each terminal device.

The cloud application may include an application with a function of displaying data information such as a text, an image, audio, or a video. The cloud application may be an entertainment application (for example, a game application). The entertainment application may be used for game entertainment of a user. In the present disclosure, the service server 1000 may obtain the service data according to the cloud application. For example, the service data may be image data (which may be referred to as first image data) that is acquired by the terminal device through a camera component and that includes the user (which may be referred to as an object).

Then, after obtaining the first image data, the service server 1000 may store the first image data to a receive queue, and then obtain the first image data from the receive queue. The service server 1000 may perform image recognition processing on the first image data. It is to be understood that after obtaining the first image data and transmitting the first image data to the service server 1000, the terminal device may continuously obtain image data (which may be referred to as second image data) including the object. The service server 1000 may also continuously obtain the second image data obtained by the terminal device from the terminal device during image recognition processing of the first image data. Similar to the first image data, the service server 1000 may store the second image data to the receive queue, thereby obtaining an updated receive queue including one or more pieces of second image data. It is to be understood that when the first image data is a first piece of image data received by the service server 1000, the service server 1000 is not required to store the first image data to the receive queue. The service server 1000 may directly perform image recognition processing on the first image data, continuously obtain the second image data (that is, a second piece of image data, a third piece of image data, a fourth piece of image data . . . after the first piece of image data) acquired by the terminal device from the terminal device during image recognition processing, and store the second image data to the receive queue.

After the service server 1000 extracts, through image recognition processing, a region (which may be referred to as a first object region) containing the object in the first image data, the service server 1000 may obtain image data (which may be referred to as first object image data) in the first object region from the first image data. The service server 1000 may transmit the first object image data to the cloud application server corresponding to the terminal device. The cloud application server may read and render the first object image data, and after obtaining rendered data through rendering, may transmit the rendered data to the terminal device. The terminal device may display and output the rendered data in the cloud application. In addition, it is to be understood that when the service server 1000 extracts the first object region containing the object in the first image data, the service server 1000 then may perform image recognition processing on other image data. For example, the service server 1000 may obtain second image data with a latest receiving timestamp (that is, last received image data) from the updated receive queue including the second image data. The service server 1000 then may perform image recognition processing on the second image data (which may be referred to as target image data) with the latest receiving timestamp. It is to be understood that when the service server 1000 performs image recognition processing on the target image data, the service server 1000 may continuously obtain image data (which may be referred to as third image data) including the object from the terminal device, and store the third image data to the updated receive queue, to obtain a new receive queue. When the service server 1000 extracts a region (which may be referred to as a second object region) containing the object in the target image data, the service server 1000 may obtain image data (which may be referred to as second object image data) in the second object region from the target image data. The service server may further transmit the second object image data to the cloud application server corresponding to the terminal device. In addition, the service server 1000 may obtain third image data (which may be referred to as new target image data) with a latest receiving timestamp from the current new receive queue. The service server 1000 then may perform image recognition processing on the new target image data.

It is to be understood that in the present disclosure, the service server 1000 may continuously receive other image data during image recognition processing of specific image data to implement recognition and reception simultaneously/synchronously, and is not required to receive the other image data after completing recognition, so that an image data receiving delay may be reduced. In addition, every time when completing recognizing specific image data (after extracting a region containing the object), the service server may perform frame skipping processing (that is, may obtain image data currently with a latest receiving timestamp, and perform image recognition processing on the image data, rather than obtaining next image data (image data with a closest receiving timestamp) of the currently processed image data and performing image recognition processing on the next image data). Frame skipping processing may reduce an image data queuing delay. Since the image data with the latest receiving timestamp is acquired according to a current behavior of the user, after image recognition and displaying are performed on the image data with the latest receiving timestamp, rendered data displayed in the cloud application may be synchronous and matched with the current behavior of the user.

In this embodiment of the present disclosure, one of the plurality of terminal devices may be selected to perform data interaction with the service server 1000. The terminal device may include but is not limited to an intelligent terminal with a multimedia data processing function (for example, a video data playing function or a music data playing function), for example, a smartphone, a tablet computer, a notebook computer, a desktop computer, a smart television, a smart speaker, a desk computer, a smartwatch, or an intelligent vehicle terminal. For example, in this embodiment of the present disclosure, the terminal device 100a shown in FIG. 1 may be integrated with the foregoing cloud application. In this case, the terminal device 100a may perform data interaction with the service server 1000 by using the cloud application.

It may be understood that a method provided in the embodiments of the present disclosure may be performed by a computer device. The computer device includes but is not limited to a user terminal or the service server. The service server may be an independent physical server, a server cluster or distributed system including a plurality of physical servers, or a cloud application server providing a basic cloud computing service such as a cloud service, a cloud database, cloud computing, a cloud function, cloud storage, a network service, cloud communication, a middleware service, domain name service, a security service, a content delivery network (CDN), or a big data and artificial intelligence platform.

The terminal device may be directly or indirectly connected to the service server through wired or wireless communication. This is not limited herein in the present disclosure.

It may be understood that the computer device (for example, the service server 1000, the terminal device 100a, or the terminal device 100b) may be a node in a distributed system. The distributed system may be a blockchain system. The blockchain system may be a distributed system including the plurality of nodes connected in a network communication form. The nodes may form a peer to peer (P2P) network. A P2P protocol is an application-layer protocol run over a transmission control protocol (TCP). In the distributed system, any form of computer device, for example, an electronic device like the service server or the terminal device, may join the P2P network to become a node in the blockchain system. For ease of understanding, the following describes the concept of blockchain. A blockchain is a novel application mode of a computer technology such as distributed data storage, P2P transmission, a consensus mechanism, or an encryption algorithm, and is mainly used for organizing data according to a time sequence, and encrypting the data into a ledger, thereby preventing the data from being tampered and falsified and implementing verification, storage, and update of the data. When the computer device is a blockchain node, an anti-tamper characteristic and an anti-falsification characteristic of the blockchain ensures that data (for example, the first image data, the first object region, or the second object image data) in the present disclosure is authentic and secure, so that a result obtained by performing related data processing based on the data is more reliable.

Figure 2A:
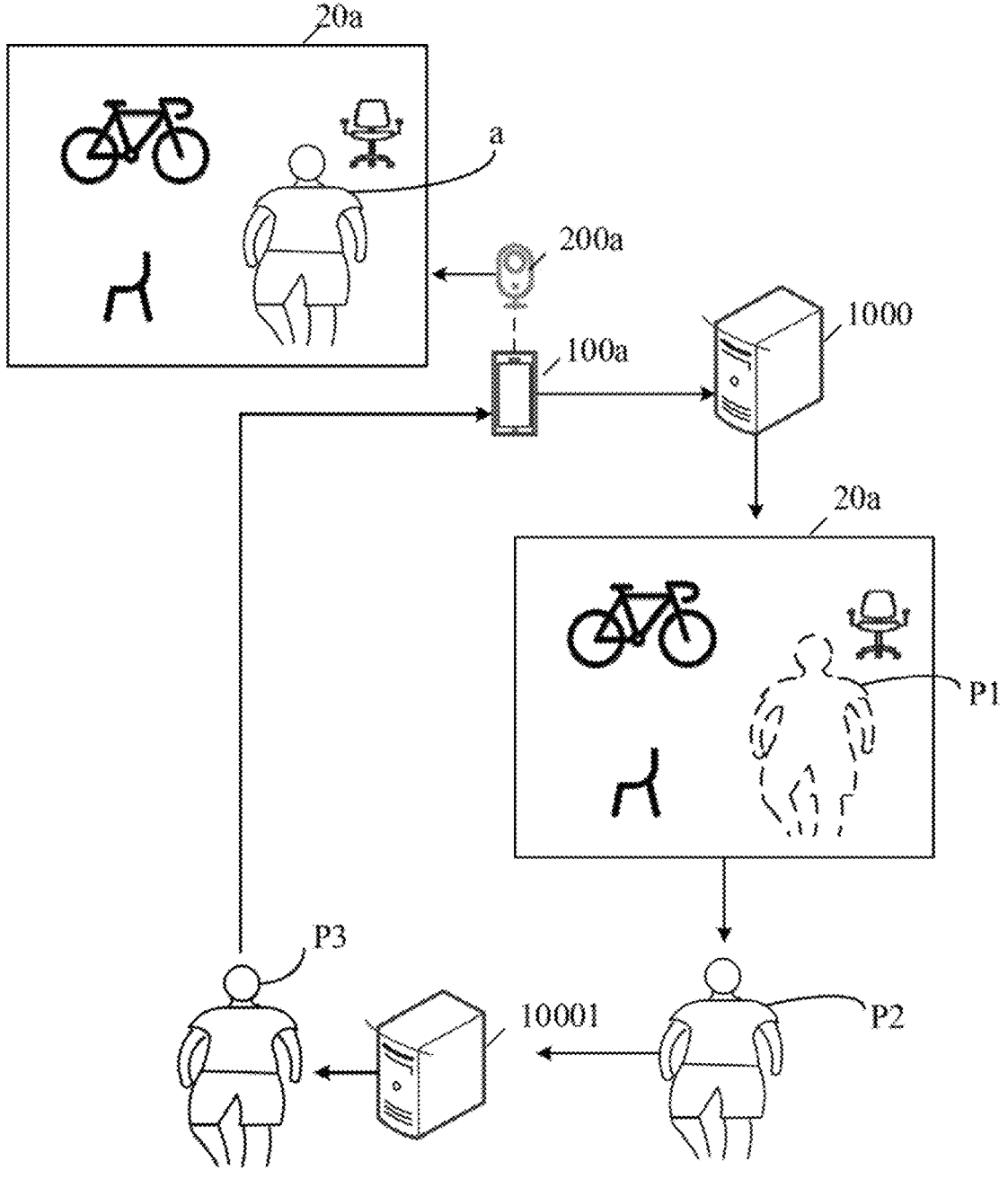
FIG. 2a is a schematic diagram of a scenario according to an embodiment of the present disclosure.

For ease of understanding, refer to FIG. 2a. FIG. 2a is a schematic diagram of a scenario according to an embodiment of the present disclosure. A terminal device 100a shown in FIG. 2a may be the terminal device 100a in the terminal device cluster 100 in the embodiment corresponding to FIG. 1. A service server 1000 shown in FIG. 2a may be the service server 1000 in the embodiment corresponding to FIG. 1. A cloud application server 10001 shown in FIG. 2a may be the cloud application server 10001 in the embodiment corresponding to FIG. 1.

As shown in FIG. 2a, the terminal device 100a may include a game application. When a user a (which may be referred to as an object a) starts the game application, the terminal device 100a may acquire a picture (which may be referred to as an original image frame 20a) including the object a by using a camera component 200a. The terminal device may perform encoding processing (for example, H264 encoding processing) on the original image frame to obtain image data. The terminal device 100a may transmit the image data to the service server 1000. The service server 1000 may store the image data to a receive queue. Then, the service server 1000 may obtain the image data from the receive queue. The service server 1000 may perform decoding processing on the image data to obtain the original image frame 20a. It may be understood that for each piece of received image data (including a first piece of image data), the service server 1000 may store the image data to the receive queue. Certainly, the first piece of image data received by the service server 1000 may be selected not to be stored, and instead, is directly decoded. For example, if the image data corresponding to the original image frame 20a is the first piece of image data received by the service server 1000, the service server 1000 may store the image data to the receive queue according to a storage rule, and then obtain the image data from the receive queue. Alternatively, the service server 1000 may not store the image data, and may directly perform decoding processing on the image data to obtain the original image frame 20a.

The service server 1000 may perform image recognition processing on the original image frame 20a. The service server 1000 may determine, through image recognition processing, an object edge curve P1 corresponding to the object a in the original image frame 20a. It is to be understood that the user a may continuously conduct action behaviors (for example, raising hands, shaking the head, or squatting), and after acquiring the original image frame 20a, the terminal device 100a may continuously acquire original image frames including the object a by using the camera component 200a. Every time when the terminal device 100a successfully acquires an original image frame including the object a, the terminal device 100a may perform encoding processing on the original image frame to obtain image data, and transmit the image data to the service server 1000. The service server 1000 may receive the image data without any impact even if currently performing image recognition processing on the original image frame 20a. The service server 1000 may continuously obtain different image data from the terminal device 100a during image recognition processing. The service server 1000 may temporarily store the image data to the receive queue.

After determining the object edge curve P1, the service server 1000 may extract an entire region (which may be referred to an object region P2) covered by the object edge curve P1 from the original image frame 20a, and obtain all image content in the object region from the original image frame 20a, thereby obtaining all image content (which may be referred to as object image data) in the object region. The service server 1000 may obtain a cloud application server (for example, the cloud application server 10001) corresponding to the terminal device 100a. The service server 1000 may transmit the object image data in the object region P2 to the cloud application server 10001. After obtaining the object image data, the cloud application server 10001 may perform rendering processing on the object image data, thereby obtaining rendered data P3. A cloud game server may transmit the rendered data P3 to the corresponding terminal device 100*a*.

Refer to FIG. 2*b*. FIG. 2*b* is a schematic diagram of a scenario according to an embodiment of the present disclosure. As shown in FIG. 2*b*, after receiving the rendered data P3, the terminal device 100*a* may display the rendered data P3 in the game application. As shown in FIG. 2*b*, a virtual environment (which may be understood as a game scenario) corresponding to a game includes a virtual background (a virtual house background), a dancing virtual object 2000*a* (which is dancing), and a dancing virtual object 2000*b*. The rendered data P3 may be displayed in the virtual environment.

It may be understood that when the service server 1000 extracts the object region P2 from the original image frame 20*a*, the service server 1000 may continue to process image data in the receive queue. In order to make the rendered data displayed by the terminal device 100*a* match a current action behavior of the object a, the service server 1000 may perform frame skipping processing. That is, the service server 1000 may obtain image data with a latest receiving timestamp in the receive queue, and perform decoding and image recognition processing on the image data. The image data with the latest receiving timestamp may be understood as last image data transmitted by the terminal device 100*a* at a current moment. The image data may correspond to a latest real-time action behavior of the object a. Therefore, after an object region corresponding to the image data is extracted, and rendering and output are performed, displayed rendered data matches an actual action behavior of the object.

It is to be understood that if the cloud application is the game application, the object a may be a game player, and rendered portrait data (for example, the rendered data P3) corresponding to the object a is displayed in the game application. That is, a player portrait is projected to the game scenario. In this way, the game player may be "placed" in the game scenario, and immersion of the game player can be improved. In addition, in this embodiment of the present disclosure, image recognition and reception may be implemented synchronously/simultaneously by using the receive queue, so that an image data receiving delay may be reduced. Moreover, frame skipping processing may increase a matching ratio between the player portrait displayed in the game and the player while improving image data recognition efficiency and further reducing a delay.

Refer to FIG. 3. FIG. 3 is a schematic flowchart of a data processing method according to an embodiment of the present disclosure. The method may be performed by a computer device. The computer device may be a terminal device (for example, any terminal device in the terminal device cluster shown in FIG. 1, for example, the terminal device 100*a*) or a service server (for example, the service server 1000 shown in FIG. 1). Alternatively, the computer device may include a terminal device and a service server, so that the method is performed by the terminal device and the service server. For ease of understanding, an example in which the method is performed by the foregoing service server is used in this embodiment for description. The data processing method may include at least the following S101 to S103:

S101: Obtain first image data transmitted by a first client, and store the first image data to a receive queue, the first image data being obtained by the first client during running of a cloud application and includes an object.

In the present disclosure, the first client may be understood as the terminal device. An application program may be deployed in the first client. The application program may be the cloud application (for example, a game application), or the like. The cloud application is used as an example. When a user uses the first client, the user may start the cloud application in the first client. For example, the user may tap the cloud application, and tap a start control to run the cloud application. The first client may be any client.

It is to be understood that after the user starts the cloud application in the first client, that is, when the first client runs the cloud application, the first client may acquire a picture including the user (which may be referred to as the object) by using a camera component. The picture including the user may be referred to as an original image frame. The first client may perform encoding processing on the original image frame, thereby obtaining an encoded image file. The encoded image file may be referred to as image data herein. The first client may transmit the image data to the service server (the service server may be a server with an image decoding function and an image recognition function, and may be configured to obtain the encoded file transmitted by the first client, and perform decoding and image recognition processing). In different encoding modes, H264 encoding, as an encoding format, has a higher compression ratio, and a same image subjected to H264 encoding occupies a smaller bandwidth in transmission. Therefore, H264 is applied extensively to a mobile video application. Therefore, in the present disclosure, H264 encoding is preferentially selected as an encoding mode for the original image frame, to reduce a transmission bandwidth between the first client and the service server. Certainly, any mode that may be used for encoding the original image frame except H264 may be used by the first client as the encoding mode for the original image frame. For example, the encoding mode may be H262 encoding, H263 encoding, or H265 encoding. The encoding mode is not limited in the present disclosure.

In the present disclosure, after obtaining the image data transmitted by the first client, the service server may store the image data to the receive queue. Taking the first image data as an example, after obtaining the first image data, the service server may store the first image data to the receive queue, specifically by the following method: receiving the first image data transmitted by the first client (the first image data is data obtained by the first client by performing encoding processing on the original image frame); and then by the service server, obtaining a receiving timestamp of receiving the first image data, and storing the first image data and the receiving timestamp associatively to the receive queue. That is, when storing each piece of image data, the service server may store a receiving moment of the image data together. For example, a receiving moment (which may be used as a receiving timestamp) of image data A by the service server is 19:09 on Sep. 5, 2021. In this case, the service server may store the image data A and the receiving moment of 19:09 on Sep. 5, 2021 associatively to the receive queue. It is to be understood that the receive queue may be empty when the receive queue does not store any image data.

S102: Perform image recognition processing on the first image data in the receive queue, and store, to the receive queue during image recognition processing of the first image data, second image data obtained and transmitted by the first client, to obtain an updated receive queue.

In the present disclosure, after the first image data is stored to the receive queue, the first image data may be obtained from the receive queue, and image recognition processing may be performed on the first image data. Since the first image data is actually the encoded image file, decoding processing may be first performed on the first image data to restore the original image frame, and then image recognition processing is performed on the original image frame. A specific method may be: performing decoding processing on the first image data to obtain decoded image data in an initial image format; then, performing format conversion on the decoded image data to obtain the original image frame in a standard image format; and then, performing image recognition processing on the original image frame in the standard image format.

It is to be understood that the standard image format may be a specified image format for unified image recognition processing. For example, it is specified that an image for image recognition processing is required to be in a red green blue (RGB) color mode, and the RGB mode may be referred to as the standard image format. After decoding processing is performed on the first image data, the decoded image data in the initial image format may be obtained. If the initial image format is the standard image format, the decoded image data may be determined as the original image frame in the standard image format. If the initial image format is different from the standard image format, format conversion may be performed to convert the decoded image data to the standard image format to obtain the original image frame in the standard image format. For example, when the initial image format is a YUV mode, the YUV mode may be converted into the RGB mode, thereby obtaining the original image frame in the RGB mode.

After obtaining, through decoding, the original image frame corresponding to the first image data, the service server may perform image recognition processing on the original image frame in the standard image format to determine a region (which may be referred to a first object region) in which the object is in the original image frame. A specific implementation of performing image recognition processing to determine the first object region may refer to subsequent descriptions in an embodiment corresponding to FIG. 5.

It may be understood that in the present disclosure, after the first client transmits the first image data to the service server, the first client may continuously acquire a picture (a new original image frame) including the object, and the first client may perform encoding processing on each original image frame to obtain an encoded image file (which may be referred to as the second image data). The first client may continuously transmit each piece of second image data to the service server. The service server does not stop receiving image data during image recognition processing of the first image data. The service server may continuously obtain the second image data from the first client. The service server may temporarily store the second image data to the receive queue, thereby obtaining the updated receive queue.

S103: Transmit, when the first object region containing the object in the first image data is extracted through image recognition processing, the first object image data to a target cloud application server, and simultaneously perform image recognition processing on the second image data with a latest receiving timestamp in the updated receive queue, the target cloud application server being configured to render the first object region to obtain rendered data, and transmit the rendered data to the first client.

In the present disclosure, the first object region in which the object is in the original image frame may be determined through image recognition processing. After the first object region is determined, image content (which may be referred to as first object image data) in the first object region may be obtained from the original image frame. The service server may extract the first object region and the first object image data in the first object region. When extracting the first object region and the first object image data, the service server may obtain the target cloud application server corresponding to the first client. The service server may transmit the first object image data to the target cloud application server. The target cloud application server may be a cloud application server corresponding to the first client. When the first client runs the cloud application, the cloud application server provides a computing service for the first client. The computing service is, for example, a central processing unit (CPU) computing service or a graphics processing unit (GPU) computing service. The target cloud application server may perform rendering processing on the first object image data, thereby obtaining the rendered data corresponding to the first object image data. The target cloud application server may transmit the rendered data to the first client. The first client may display the rendered data in the cloud application.

In addition, it is to be understood that after the service server extracts the first object region, the service server may continue to perform decoding and image recognition processing on other image data. For example, the service server may obtain the second image data with the latest receiving timestamp in the receive queue. The service server may perform decoding and image recognition processing on the second image data.

A process in which the service server obtains the second image data with the latest receiving timestamp in the updated receive queue and performs decoding and image recognition processing on the second image data may be referred to as frame skipping processing. For ease of understanding, refer to FIG. 4 together. FIG. 4 is a schematic diagram of frame skipping processing according to an embodiment of the present disclosure. As shown in FIG. 4, a receive queue 40a may include image data 1, image data 2, image data 3, image data 4, image data 5, image data 6, image data 7, image data 8, and image data 9. The image data 1 to the image data 9 are sorted according to a sequence from early to late receiving timestamps, and are represented by reference signs 1, 2, 3, 4, 5, 6, 7, 8, and 9 respectively in FIG. 4. That is, a receiving timestamp of the image data 1 is an earliest receiving timestamp, and a receiving timestamp of the image data 9 is a latest timestamp. The image data 1, the image data 2, the image data 3, the image data 4, and the image data 5 are processed image data. The image data 6 is image data currently processed by the service server. The image data 7, the image data 8, and the image data 9 are image data received by the service server during processing of the image data 6. The image data 7, the image data 8, and the image data 9 are waiting in queue for processing.

As shown in FIG. 4, when the service server extracts an object region of the object in the image data 6, the service server may obtain the image data 9 at a tail of the receive queue 40a (that is, obtain image data with the latest receiving timestamp). The service server may skip the image data 7 and the image data 8, and then perform decoding and image recognition processing on the image data 9. This is a frame skipping processing process. For ease of understanding, the following uses an example for detailed description. It is assumed that time required by the service server to perform decoding and image recognition processing is 30 ms, and a time interval between reception of two pieces of image data by the service server is 10 ms (that is, one piece of image data is received at a 0th ms, next image data is received at a 10th ms, and the next of the next image data is received at a 20th ms). In this case, when the service server processes the image data 6, the service server may continuously receive the image data 7 (which may be stored to the tail of the receive queue, that is, after the image data 6), the image data 8 (which may be stored to the tail of the receive queue, that is, after the image data 7), and the image data 9 (which may be stored to the tail of the receive queue, that is, after the image data 8). After the image data 6 is completely processed, the receive queue is shown by the receive queue 40*a*. In this case, the service server may directly obtain latest image data (that is, the image data 9) from the tail of the receive queue, skipping the image data 7 and the image data 8 (the image data 7 and the image data 8 are not processed, but are actually skipped and will not be processed, so that the image data 7 and the image data 8 may be determined as processed image data).

Similarly, as shown in FIG. 4, when processing the image data 9, the service server may also continuously receive image data 10 and image data 11 (represented by reference signs 10 and 11 in FIG. 4), to obtain a receive queue 40*b*. When an object region in which the object is in the image data 9 is extracted, image data (that is, the image data 11 with a latest receiving timestamp) at a tail of the receive queue 40*b* may be obtained. The service server may skip the image data 10, and perform decoding and image recognition processing on the image data 11. Similarly, when processing the image data 11, the service server may continuously receive other image data to obtain a receive queue 40*c*. When the image data 11 is completely processed, image data at a tail of the receive queue 40*c* may be obtained. The operations are repeated. This process will not be elaborated herein.

It may be understood that every time when a piece of image data is processed, image data (that is, processed image data) arranged before the image data may be cleared, thereby enlarging storage space of the receive queue. For example, if processed image data in the receive queue 40*a* includes the image data 1 to the image data 5, the image data 1 to the image data 5 may be deleted, and then the receive queue 40 includes only the image data 6 to the image data 9. Alternatively, every time when a piece of image data is completely processed, image data with a latest receiving timestamp in the receive queue may be obtained, and after the image data is obtained, image data (which may be referred to as historical image data) arranged before the image data (that is, a receiving timestamp is earlier than that of the image data) may be deleted. For example, the image data 9 in the receive queue 40*a* is obtained as to-be-processed image data. In this case, historical image data (including the image data 1 to the image data 8) before the image data 9 has been deleted.

That is, when the first object region in the first image data is extracted, processed image data (including the first image data) may be cleared first, and then the second image data with the latest receiving timestamp is obtained from remaining unprocessed image data. Similarly, when the first object region in the first image data is obtained, the second image data with the latest receiving timestamp may be obtained first, and then historical image data whose receiving timestamp is earlier than that of the second image data is deleted (that is, the second image data with the latest receiving timestamp in the updated receive queue is obtained first, then image recognition processing is performed on the second image data, and the historical image data in the updated receive queue is synchronously deleted, the historical image data being the image data whose receiving timestamp is earlier than that of the second image data in the updated receive queue). It is to be understood that either of the queue clearing methods is for improving the storage space of the queue. The queue emptying method will not be specifically limited in the present disclosure.

It is to be noted that after the service server receives an encoded bitstream (that is, the image data) transmitted by the first client, if time for decoding and image recognition processing (which is referred to as image processing) is longer than the time interval between reception of two frames of image data (for example, the image processing time is 30 ms, and the time interval between reception of the two frames of image data is 10 ms), and there is no receive queue, the first client may keep waiting for the service server to perform image processing on the current image data. As a result, an image data transmission delay is greatly prolonged, and image data transmission efficiency may be affected seriously. In the present disclosure, the image data may be stored by using the receive queue, so that the service server may continuously receive image data transmitted by the first client during image processing. However, if the service server sequentially performs image processing on the image data, there may be a serious mismatch between the image data recognized by the service server and a latest status of the object, and the image data recognized by the service server lags seriously. Therefore, frame skipping processing may ensure that the service server performs image processing on latest image data every time when performing image processing, which may reduce an image recognition delay. In addition, due to a high computing capability of the service server, image recognition efficiency may be improved.

In this embodiment of the present disclosure, when obtaining the first image data including the object, a client (for example, the first client) may transmit the first image data to a related computer device (for example, the service server), the service server performs image recognition processing, and the first client is not required to perform image recognition locally. In this way, image recognition processing may be performed on the first image data by using the service server with a high computing capability, so that image recognition efficiency and a definition may be improved. In addition, in the present disclosure, the service server may store the received first image data to the receive queue, continuously obtain the second image data synchronously from the first client during image recognition processing of the first image data, and store the second image data to the receive queue to obtain the updated receive queue. That is, in the present disclosure, the service server does not stop receiving the second image data during image recognition processing of the first image data, and may implement image processing and image reception synchronously by using the receive queue. In this way, an image transmission delay may be reduced. Further, when the service server extracts, through image recognition processing, the first object region in which the object is in the first image data, the service server may transmit the first object image data in the first object region to the target cloud application server, and the target cloud application server performs rendering, and transmits the rendered data obtained through rendering to the first client. In this way, displaying may be performed in the cloud application. In addition, after extracting the first object region, the service server may obtain the second image data with the latest receiving timestamp in the receive queue, and continue to process the second image data. It can be seen that in the present disclosure, image data is not recognized one by one according to a time sequence of receiving timestamps, and instead, image data with a latest receiving timestamp is obtained from the receive queue for processing after image recognition processing is performed on specific image data, so that image data recognition efficiency may be improved. In addition, since the image data with the latest receiving timestamp is acquired according to a current behavior of the object, when image recognition and displaying are performed on the image data with the latest receiving timestamp, the current behavior of the object is matched. In summary, according to the present disclosure, the image recognition efficiency may be improved, the image transmission delay may be reduced, and it may be ensured that a virtual behavior of a virtual object displayed in the cloud application matches a current behavior status of the object.

Refer to FIG. 5. FIG. 5 is a schematic flowchart of a data processing method according to an embodiment of the present disclosure. The process may correspond to the process of performing image recognition processing on the original image frame to determine the first object region in the embodiment corresponding to FIG. 3. As shown in FIG. 5, the process may include at least the following S501 to S503:

S501: Recognize object edge key points of the object in the original image frame.

The object edge key point herein may be an object contour key point of the object. The original image frame includes a key part of the object. The object contour key point herein may be a contour key point of the key part. If the key part is the head, the object edge key point may be a head contour key point. If the key part is the neck, the object edge key point may be a neck contour key point.

Recognition of the object edge key point of the object may include recognition based on an artificial intelligence algorithm, recognition based on a dedicated GPU, and another manner. This is not limited in the present disclosure.

S502: Connect the object edge key points to obtain an object edge curve of the object.

After the object edge key points are determined, the object edge key points may be connected (for example, every two adjacent points are connected) to obtain the object edge curve (which may be understood as an object contour) corresponding to the object. For example, refer to the scenario embodiment corresponding to FIG. 2a. The curve P1 shown in FIG. 2a may be regarded as an object contour of the object a.

S503: Determine a region covered by the object edge curve in the original image frame as an initial object region of the object in the original image frame, and determine the first object region according to the initial object region.

After an object edge curve of the object a is determined, a region covered by the object edge curve in the original image frame may be determined. The region may be used as the first object region of the object in the original image frame. For example, refer to the scenario embodiment corresponding to FIG. 2a. As shown in FIG. 2a, a region covered by the object edge curve P2 in the original image frame 20a is the region P1 (the region P1 is a region in which the object a is). The region P1 may be determined as a region (which may be referred to as the first object region herein) in which the object is in the original image frame.

In one embodiment, the region covered by the object edge curve may be referred to as the initial object region. After the initial object region is determined, the initial object region may temporarily not be determined as a final first object region. Instead, the first object region is determined according to the initial object region. A specific method may be: obtaining an object key part, presented by the initial object region, of the object; then, obtaining object recognition configuration information for the object and a configured object recognition part indicated by the object recognition configuration information, and matching the configured object recognition part with the object key part; and performing, when the configured object recognition part matches the object key part, the operation of determining the first object region according to the initial object region; or determining, when the configured object recognition part does not match the object key part, that the first object region is not extracted through image recognition processing.

It is to be understood that after the initial object region of the object is determined, the object key part, presented by the initial object region, of the object may be obtained (the object key part may be a body part of the object, for example, the head, the neck, an arm part, the abdomen, the leg, or the foot). Then, the configured object recognition part (that is, a recognition rule specifying a part of the object required to be included in the original image frame acquired by the terminal device) of the object required to be included in the original image frame may be obtained. An example in which the configured object recognition part is the leg is used. If the original image frame acquired by the terminal device is required to include the leg of the user, but the object key part presented by the initial object region extracted by performing decoding and image recognition processing on the received image data is the head and the neck, it may be determined that the object key part (the head and the neck) does not match the configured object recognition part (the leg), and the object key part presented in the original image frame does not meet a requirement. In this case, it may be directly determined that the first object region cannot be extracted through image recognition processing (that is, the part does not meet the requirement, and extraction fails). If the original image frame acquired by the terminal device is required to include the leg of the user, but the object key part presented by the initial object region extracted by performing decoding and image recognition processing on the received image data is the leg, it may be determined that the object key part presented in the original image frame meets a requirement. In this case, the initial object region may be determined as the first object region.

In one embodiment, from the above descriptions, if it is determined that the configured object recognition part does not match the object key part, after determining that the first object region is not extracted through image recognition processing, the service server may obtain next image data of the current image data in the updated receive queue, and then perform image processing on the next image data. For example, the current image data is the first image data, next image data (that is, image data with an earliest receiving timestamp in image data whose receiving timestamp is later than that of the first image data) of the first image data in the receive queue may be obtained, and then the service server may perform image processing on the next image data. A specific method may be: determining second image data with an earliest receiving timestamp in the updated receive queue as to-be-recognized image data; and then, performing image recognition processing on the to-be-recognized image data, and transmitting, when a to-be-processed object region in which the object is in the to-be-recognized image data is extracted through image recognition processing, the to-be-processed object region to the target cloud application server.

In fact, if the service server performs image processing on the current image data (for example, the first image data) fast and efficiently enough, after it is determined that the first object region is not extracted through image recognition processing, the next image data (the image data with the earliest receiving timestamp) of the current image data may be obtained, and image processing is performed on the next image data. A purpose of doing this is that when the user performs an action, the first client obtains and encodes an image frame, and transmits the encoded image frame to the service server, the service server fast recognizes that an object key part in the image frame is not compliant, and cannot extract an object region and image data in the object region. As a result, the cloud application server cannot receive extracted object image data and perform alignment for rendering and displaying. In this case, the service server may perform image processing on next image data to extract an object region in the next image data, and then transmit object image data in the object region to the cloud application server for rendering and output. In this way, jitter of a portrait of the user displayed in the cloud application may be reduced, and coherence of the portrait may be improved. Certainly, after it is determined that the first object region is not extracted through image recognition processing, the second image data with the latest receiving timestamp may alternatively be obtained from the current updated receive queue (rather than obtaining the image data with the earliest receiving timestamp), and image processing is performed on the second image data. Either of the obtaining methods is an example processing method after it is determined that the first object region is not extracted through image recognition processing. A specific processing method may be set manually according to an actual situation, and will not be limited in the present disclosure.

In one embodiment, from the above descriptions, when it is determined that the configured object recognition part matches the object key part, the initial object region may be directly determined as the first object region. In addition, when it is determined that the configured object recognition part matches the object key part, a specific method for determining the first object region may alternatively be: obtaining an object key part, presented by the initial object region, of the object; and determining the initial object region as the first object region when the object key part has part completeness; or obtaining N (N is a positive integer) sample image frames in a sample database when the object key part does not have part completeness, obtaining a to-be-processed sample image frame corresponding to the object from the N sample image frames, and determining the first object region according to the to-be-processed sample image frame and the initial object region.

A specific method for determining the first object region according to the to-be-processed sample image frame and the initial object region may be: obtaining overall part information in the to-be-processed sample image frame; then, determining a to-be-fused part region in the overall part information according to the object key part; and fusing the to-be-fused part region and the initial object region to obtain the first object region.

It is to be understood that in the present disclosure, complete overall portrait sample data (complete portrait sample data from the head to the foot) of the user may be pre-collected. One user may correspond to one sample image frame. One sample image frame may present complete overall portrait data of one user. In this case, when the initial object region is extracted, and it is determined that the configured object recognition part matches the object key part, whether the object key part has part completeness may be determined. If the object key part has part completeness, the initial object region may be directly determined as the first object region. If the object key part does not have part completeness, the to-be-processed sample image frame corresponding to the object may be obtained from the sample database, then the overall part information of the object is obtained from the to-be-processed sample image frame, and the initial object region is completed according to the overall part information, to obtain a complete first object region including a complete part.

Figure 6:
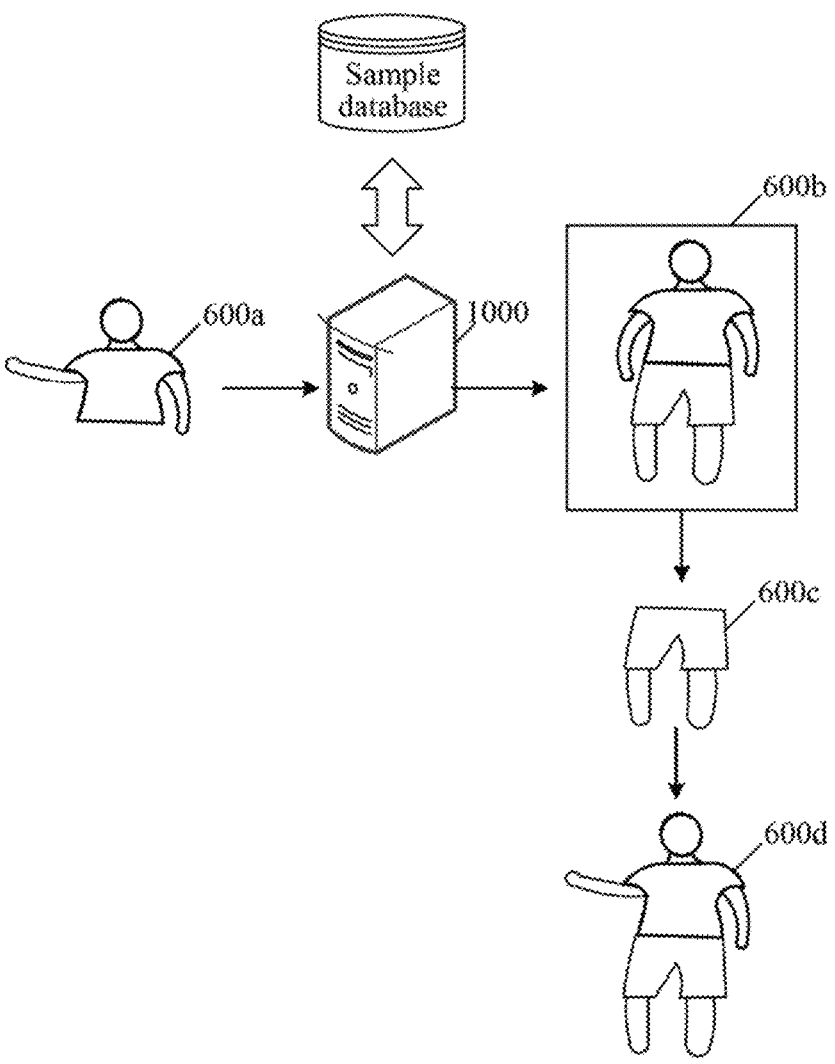
FIG. 6 is a schematic diagram of a part fusion scenario according to an embodiment of the present disclosure.

For ease of understanding, refer to FIG. 6 together. FIG. 6 is a schematic diagram of a part fusion scenario according to an embodiment of the present disclosure. As shown in FIG. 6, it is assumed that the initial object region is an initial object region 600a, and an object key part presented in the initial object region 600a includes the head, the neck, the arm part, the chest, and the abdomen (that is, the upper body of the user). If the configured object recognition part is also the upper body of the user, that is, the first client is required to acquire the upper body of the user, the initial object region meets the requirement. Further, whether the object key part has part completeness may be determined. In this case, if part completeness is specified to be overall portrait completeness of the user (that is, the upper body and the lower body, that is, the head to the foot, are required to be included), the object key part presented by the initial object region 600a does not have part completeness. In this case, the service server 1000 may obtain the to-be-processed sample image frame (assumed to be a to-be-processed sample image frame 600b) corresponding to the object in the sample database. As shown in FIG. 6, the overall part information presented in the to-be-processed sample image frame includes complete information of the object from the head to the foot. Since the initial object region 600a includes the upper body, the lower body in the to-be-processed sample image frame is determined as the to-be-fused part region (that is, a region 600c), and the to-be-fused part region 600c is extracted. Further, the to-be-fused part region 600c and the initial object region 600a are fused (for example, stitched), thereby obtaining a first object region 600d including the upper body and the lower body. It is to be understood that the overall part information (for example, from the head to the foot) of the user is acquired in advance, so that every time when obtaining a picture of the user, the first client is not required to strictly require the user every time to stand at a fixed position at which complete parts can be acquired, the user may move flexibly, the first client is only required to obtain partial part information, and after obtaining the partial part information from the first client, the service server may supplement and stitch the partial part information according to the overall part information acquired in advance, to obtain the complete parts. In this way, experience and immersion of the user may be improved.

It is to be noted that in the foregoing process, if part completeness is specified to be completeness of the upper body of the user, the object key part presented by the initial object region 600a actually has part completeness. In this case, the initial object region 600a may be directly determined as the first object region.

A specific method for obtaining the to-be-processed sample image frame corresponding to the object in the sample database may be as follows. Face matching may be used. Alternatively, when a sample image frame of the user is acquired, the corresponding sample image frame is identified by using a user identifier (for example, a user name or a user serial number), such that each sample image frame has a user identifier (which may be referred to as a sample identifier). When transmitting image data to the service server, the first client may transmit the user identifier of the user in the image data together. Then, the service server may obtain a corresponding to-be-processed sample image frame
through matching according to the carried user identifier and
the sample identifier of the sample image frame. Certainly,
a specific implementation of obtaining the to-be-processed
sample image frame corresponding to the object in the
sample database is not limited to the above-described meth-
ods. The specific implementation is not limited in the present
disclosure.

In this embodiment of the present disclosure, when
obtaining the first image data including the object, a client
(for example, the first client) may transmit the first image
data to a related computer device (for example, the service
server), the service server performs image recognition pro-
cessing, and the client is not required to perform image
recognition locally. In this way, image recognition process-
ing may be performed on the first image data by using the
service server with a high computing capability, so that
image recognition efficiency and a definition may be
improved. In addition, in the present disclosure, the service
server may store the received first image data to the receive
queue, continuously obtain the second image data synchro-
nously from the first client during image recognition pro-
cessing of the first image data, and store the second image
data to the receive queue to obtain the updated receive
queue. That is, in the present disclosure, the service server
does not stop receiving the second image data during image
recognition processing of the first image data, and may
implement image processing and image reception synchro-
nously by using the receive queue. In this way, the image
transmission delay may be reduced. Further, when the
service server extracts, through image recognition process-
ing, the first object region in which the object is in the first
image data, the service server may transmit the first object
image data in the first object region to the target cloud
application server, and the target cloud application server
performs rendering, and transmits the rendered data
obtained through rendering to the first client. In this way,
displaying may be performed in the cloud application. In
addition, after extracting the first object region, the service
server may obtain the second image data with the latest
receiving timestamp in the receive queue, and continue to
process the second image data. It can be seen that in the
present disclosure, image data is not recognized one by one
according to a time sequence of receiving timestamps, and
instead, image data with a latest receiving timestamp is
obtained from the receive queue for processing after image
recognition processing is performed on specific image data,
so that image data recognition efficiency may be improved.
In addition, since the image data with the latest receiving
timestamp is acquired according to a current behavior of the
object, when image recognition and displaying are per-
formed on the image data with the latest receiving time-
stamp, the current behavior of the object is matched. In
summary, according to the present disclosure, the image
recognition efficiency may be improved, the image trans-
mission delay may be reduced, and it may be ensured that a
virtual behavior of a virtual object displayed in the cloud
application matches a current behavior status of the object.

In one embodiment, when each client runs the cloud
application for the first time, a cloud application server
corresponding to each client may transmit a registration
request to the service server. The registration request is used
for requesting device registration to the service server. After
registration, the service server may add a device identifier
corresponding to the cloud application server to a stored
device identifier set, thereby proving that the cloud appli-
cation server is a registered cloud application server. When the cloud application server is a registered cloud application
server, it indicates that the cloud application server is a legal
cloud application server. In this case, the service server may
perform data interaction with the legal cloud application
server. Then, when the first client transmits image data (for
example, the first image data) to the service server, a device
identifier (which may be referred to as a to-be-confirmed
device identifier) of the cloud application server (which may
be referred to as a bound cloud application server) in a
binding relationship may be transmitted together for the
service server to confirm, according to the device identifier,
whether the cloud application server is registered (legal).
When it is determined that the bound cloud application
server is registered, the bound cloud application server is
determined as the target cloud application server, and then
the first object image data is transmitted to the target cloud
application server. That is, before the service server trans-
mits the first object image data to the target cloud application
server after determining the first object region, whether the
cloud application server corresponding to the first client is
registered may be determined first, and when it is deter-
mined that the cloud application server is registered, the first
object image data is sent to the corresponding target cloud
application server.

Figure 7:
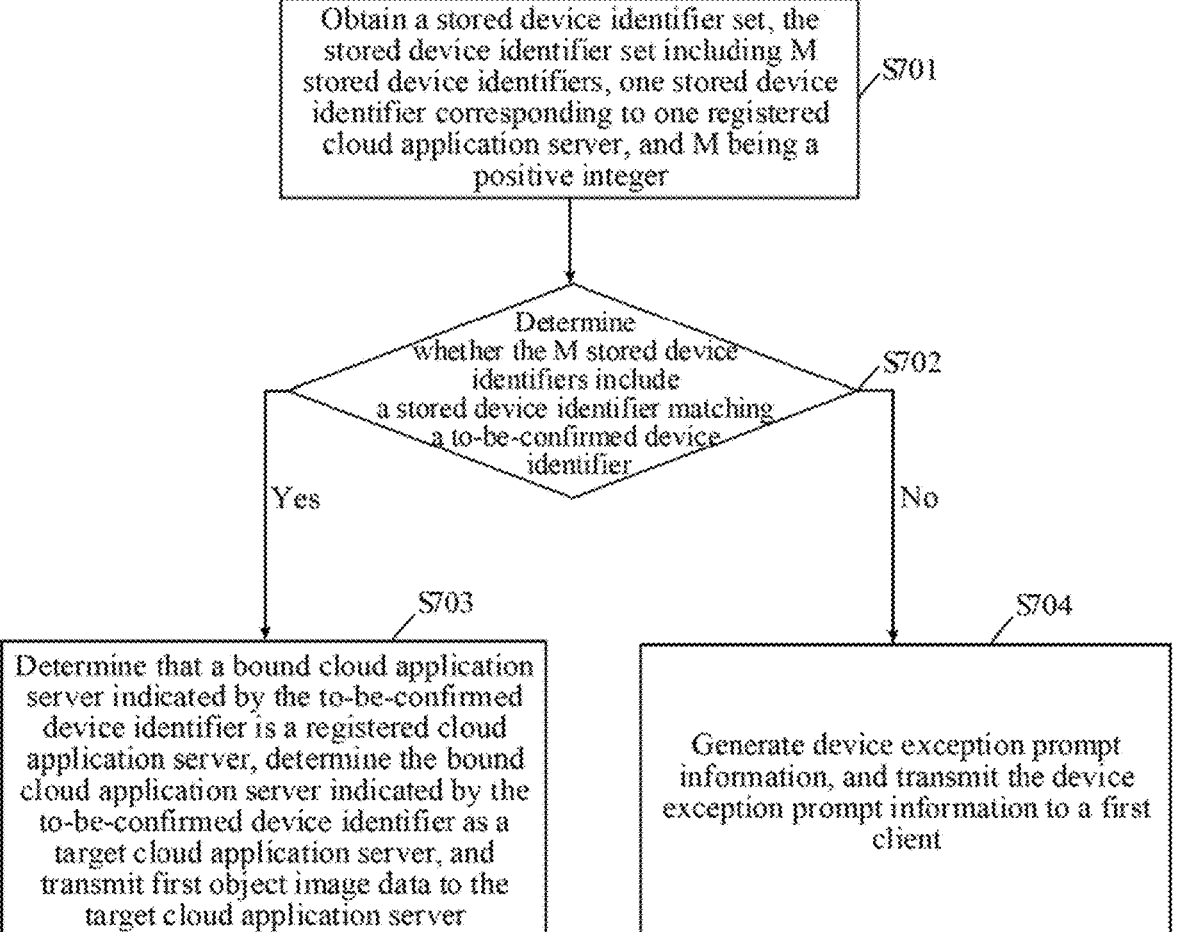
FIG. 7 is a schematic flowchart of transmitting first object image data to a target cloud application server according to an embodiment of the present disclosure.

For ease of understanding, refer to FIG. 7. FIG. 7 is a
schematic flowchart of transmitting the first object image
data to the target cloud application server according to an
embodiment of the present disclosure. The process is
described by using an example in which the first image data
carries the to-be-confirmed device identifier (the to-be-
confirmed device identifier is the device identifier of the
bound cloud application server, and the bound cloud appli-
cation server is in the binding relationship with the first
client). As shown in FIG. 7, the process may include at least
the following S701 to S704:

S701: Obtain the stored device identifier set, the stored
device identifier set including M stored device identifiers,
one stored device identifier corresponding to one registered
cloud application server, and M being a positive integer.

When each client runs the cloud application (generally
runs the cloud application for the first time), the cloud
application server corresponding to each client may transmit
the registration request to the service server. The registration
request is used for requesting device registration to the
service server. After registration, the service server may add
the device identifier corresponding to the cloud application
server to the stored device identifier set, thereby proving that
the cloud application server is a registered cloud application
server. An example in which the client is a second client is
used. A specific method may be as follows: when the user
starts the cloud application by using the client, the second
client may generate an application starting notification in
response to the present disclosure starting operation. The
second client may transmit the application starting notifica-
tion to a corresponding cloud application server (which may
be referred to a to-be-registered cloud application server).
Then, the to-be-registered cloud application server may
transmit a registration request to the service server based on
the application starting notification. The service server may
receive the registration request transmitted by the to-be-
registered cloud application server. Then, the service server
may detect device index information of the to-be-registered
cloud application server according to the registration
request. When the device index information satisfies a
processing quality condition, a to-be-stored device identifier
of the to-be-registered cloud application server is obtained,
the to-be-stored device identifier is stored to the stored device identifier set, the to-be-registered cloud application server is converted into a registered cloud application server, and the to-be-stored device identifier is converted into a stored device identifier.

The device index information may include a network quality parameter, a device version, a functional module quality index, a storage space index, and the like. Detecting the device index information herein may be detecting whether a specific index is up to standard. For example, whether the network quality parameter is up to standard may be detected, and if the network quality parameter is up to standard, it may be considered that the device index information of the to-be-registered cloud application server satisfies the processing quality condition. Alternatively, detecting the device index information may be detecting two or more indexes are up to standard, and only when the indexes are all up to standard, it is confirmed that the device index information of the to-be-registered cloud application server satisfies the processing quality condition.

The following uses an example in which the device index information includes the network quality parameter and the device version to describe a specific method for detecting the device index information of the to-be-registered cloud application server. The specific method may be: obtaining the network quality parameter and the device version of the to-be-registered cloud application server according to the registration request; and determining, when the network quality parameter reaches a parameter threshold and the device version matches a quality standard version (which may be understood as a qualified version), that the device index information satisfies the processing quality condition; or determining, when the network quality parameter does not reach a parameter threshold and the device version does not match a quality standard version, that the device index information does not satisfy the processing quality condition.

It can be seen from the above that the stored device identifier set stores stored device identifiers corresponding to different registered cloud application servers. Then, after the to-be-confirmed device identifier transmitted by the first client is obtained, the stored device identifier set may be obtained, and then the to-be-confirmed device identifier is matched with the stored device identifier set.

S702: Determine whether the M stored device identifiers include a stored device identifier matching the to-be-confirmed device identifier.

If the M stored device identifiers include the stored device identifier matching the to-be-confirmed device identifier, subsequent S703 is performed; or if the M stored device identifiers do not include the stored device identifier matching the to-be-confirmed device identifier, subsequent S704 is performed.

S703: Determine, when the M stored device identifiers include the stored device identifier matching the to-be-confirmed device identifier, that the bound cloud application server indicated by the to-be-confirmed device identifier is a registered cloud application server, determine the bound cloud application server indicated by the to-be-confirmed device identifier as the target cloud application server, and transmit the first object image data to the target cloud application server.

The to-be-confirmed device identifier is matched with the M stored device identifiers. If the M stored device identifiers include the stored device identifier matching the to-be-confirmed device identifier, it may be determined that the bound cloud application server indicated by the to-be-confirmed device identifier is a registered cloud application server. In this case, the bound cloud application server indicated by the to-be-confirmed device identifier may be determined as the target cloud application server, and the first object image data may be transmitted to the target cloud application server.

S704: Generate device exception prompt information when the M stored device identifiers do not include the stored device identifier, and transmit the device exception prompt information to the first client.

The to-be-confirmed device identifier is matched with the M stored device identifiers. If the stored device identifier set does not include the stored device identifier matching the to-be-confirmed device identifier, it may be determined that the bound cloud application server indicated by the to-be-confirmed device identifier is an unregistered cloud application server, the bound cloud application server is not registered, and the service server cannot transmit the first object image data to the bound cloud application server. In this case, the service server may generate the device exception prompt information (which may be server unregistration prompt information). The service server may return the device exception prompt information to the first client. The first client may transmit a registration notification to the corresponding bound cloud application server based on the device exception prompt information. The bound cloud application server may apply to the service server for registration based on the registration notification.

It is to be understood that in fact, in one embodiment, the first client is not the only one transmitting image data to the service server, and different clients may transmit image data to the service server. Since different clients correspond to different cloud application servers, there are a plurality of cloud application servers registered to the service server (there are a plurality of cloud application servers connected to the service server). In the present disclosure, the stored device identifier set is pre-stored, and when transmitting image data, the client transmits a device identifier of a corresponding cloud game server together. In this way, a correspondence between a client and a cloud application server may be determined. In addition, whether the cloud application server is registered may be determined. Therefore, a user picture acquired by the client may be transmitted to the right registered cloud application server. This may improve correctness of the picture user displayed in the cloud application.

It may be understood that for each cloud application server, for example, the target cloud application server, processing steps during reception of portrait data (that is, object image data, for example, the first object image data) transmitted by the service server may generally include the following three steps:

1: Allocate a receive buffer, and write the portrait data (for example, the first object image data) to the receive buffer.

2: After reception is completed, copy the portrait data for processing and rendering.

3: After rendering is completed, return to step 1.

That is, the target cloud application server is required to first write the portrait data to the buffer, then read and render the portrait data, and after completing rendering, continue to receive portrait data and write the portrait data to the buffer. A received data volume of portrait data with a high resolution is large. As a result, it takes much time for the target cloud application server to allocate a buffer and copy the data, which seriously affects subsequent portrait data receiving time and causes a long delay. Thus, it can be seen that from the above, frame skipping processing of the service server may reduce an image receiving delay of a service server side, but there is still a delay on a cloud application server side. The present disclosure provides a data processing method, so as to further reduce the delay. The method is to allocate two buffers on the cloud application server side. For ease of understanding, refer to FIG. 8 together. FIG. 8 is a schematic flowchart of a data processing method according to an embodiment of the present disclosure. The process is performed by a computer device. The computer device may be a target cloud application server, for example, a cloud game server. The process may correspond to a data processing process after the target cloud application server receives object image data. As shown in FIG. 8, the process may include at least the following S801 to S804:

S801: Receive first object image data transmitted by a service server, and store the first object image data to a first buffer whose working status is a storage state in a buffer set, the first object image data being image data in a first object region, the first object region being a region, that is obtained after the service server performs image recognition processing on first image data and that an object is in, in the first image data, the first image data being transmitted by a first client to the service server, and the first image data being image data that is obtained by the first client during running of a cloud application and that includes the object.

Determining and extraction processes of the first object region and the first object image data may refer to the descriptions in S102 in the embodiment corresponding to FIG. 3, and will not be elaborated herein. After extracting the first object region and obtaining the first object image data, the service server may transmit the first object image data to the target cloud application server. The target cloud application server may store the first object image data to the first buffer whose working status is the storage state in the buffer set.

The target cloud application server may pre-allocate two receive buffers of the same size, and set a working status of one of the two buffers to the storage state. That is, the buffer is actually a store buffer. The target cloud application server may store received data to the store buffer. In addition, a working status of the other buffer may be set to a read state. That is, the buffer is actually a read buffer. When required to read and render data, the target cloud application server may read the data from the read buffer.

Taking two buffers as an example, a specific method for allocating two buffers to generate the buffer set may be: pre-allocating the first buffer and a second buffer; then, setting an initial pointer identifier of the first buffer to be a storage pointer identifier, and setting an initial pointer identifier of the second buffer to be a read pointer identifier, it is to be understood that the working status of the first buffer with the storage pointer identifier is the storage state, and a working status of the second buffer with the read pointer identifier is the read state; and then, generating the buffer set according to the first buffer whose working status is the storage state and the second buffer whose working status is the read state. In this case, when the first object image data is received, since the working status of the first buffer is the storage state, the first object image data may be stored to the first buffer.

S802: Adjust the working status of the first buffer to the read state when the second buffer whose working status is the read state in the buffer set does not include unprocessed object image data, adjust the working status of the second buffer to the storage state, read the first object image data from the first buffer whose working status is the read state, and perform rendering processing on the first object image data.

Through the foregoing descriptions, an initial working status of the first buffer is the storage state, and an initial working status of the second buffer is the read state. When receiving and storing the first image data, the target cloud application server may synchronously read and render data (which may be referred to as stored image data) that has been stored in the second buffer. If the second buffer currently stores no image data, that is, the second buffer does not include unprocessed object image data, after the first object image data is stored to the first buffer, the storage pointer identifier of the first buffer is switched to the read pointer identifier, and the storage pointer identifier of the second buffer is switched to the storage pointer identifier. In this way, the working statuses of the first buffer and the second buffer are swapped/interchanged, a current working status of the first buffer is changed to the read state, and a current working status of the second buffer is changed to the storage state. In this case, the first object image data may be read from the first buffer and rendered, and meanwhile, second object image data may continue to be received and stored to the second buffer.

It is to be understood that due to setting of the two buffers, the target cloud application server may synchronously implement read and reception, and may receive other data without waiting until completing rendering. Therefore, a receiving delay may be reduced greatly.

It is to be understood that through the foregoing descriptions, the initial working status of the first buffer is the storage state, and the initial working status of the second buffer is the read state. When receiving and storing the first image data, the target cloud application server may synchronously read and render the data (which may be referred to as the stored image data) that has been stored in the second buffer. If the second buffer stores image data, but all the image data have been read and rendered, the processed image data in the second buffer may be cleared. In this case, it may be determined that the second buffer does not include unprocessed image data, and pointer identifier switching may be performed to adjust the working status of the first buffer to the read state and adjust the working status of the second buffer to the storage state. Then, the first object image data is read from the first buffer in the read state, and is rendered.

S803: Receive, during rendering of the first object image data, the second object image data transmitted by the service server, and store the second object image data to the second buffer whose working status is the storage state, the second object image data being image data in a second object region, the second object region being obtained by the service server by performing image recognition processing on second image data after extracting the first object region, the second object region being a region in which the object is in the second image data, the second image data being image data that is obtained by the service server from an updated receive queue when the first object region is extracted and that has a latest receiving timestamp, and second image data in the updated receive queue being continuously obtained by the service server from the first client during image recognition processing of the first image data.

The second object region may be a region obtained by the service server by performing image recognition processing on the second image data. The second object image data may be image data in the second object region in the second image data. A specific extraction manner for the second object region may be the same as that for the first object region, and will not be elaborated herein.

During rendering of the first object image data, the second object image data transmitted by the service server may be received. In fact, the target cloud application server may synchronously receive data during data reading, and store the data to the second buffer currently in the storage state. In this way, the delay may be reduced.

S804: Adjust the working status of the first buffer to the storage state when rendered data corresponding to the first object image data is obtained, adjust the working status of the second buffer to the read state, read the second object image data from the second buffer whose working status is the read state, and perform rendering processing on the second object image data.

When stored data in the first buffer is completely read and rendered (that is, the rendered data corresponding to the first object image data is obtained if the first buffer includes only the first object image data), the working status of the first buffer is adjusted to the storage state, and the working status of the second buffer is adjusted to the read state. In this case, the second object image data is read from the second buffer whose working status is the read state, and rendering processing is performed on the second object image data. Other object image data may also be received synchronously and stored to the first buffer in the storage state. A specific implementation of adjusting the working status of the first buffer to the storage state and adjusting the working status of the second buffer to the read state may also be switching the pointer identifiers. A specific method may be: obtaining, when first rendered data corresponding to the first object region is obtained, the read pointer identifier that corresponds to the first buffer and that is used for representing the read state and the storage pointer identifier that corresponds to the second buffer and that is used for representing the storage state; switching the read pointer identifier corresponding to the first buffer to the storage pointer identifier, the working status of the first buffer with the storage pointer identifier being the storage state; and switching the storage pointer identifier corresponding to the second buffer to the read pointer identifier, the working status of the second buffer with the read pointer identifier being the read state.

Figure 9:
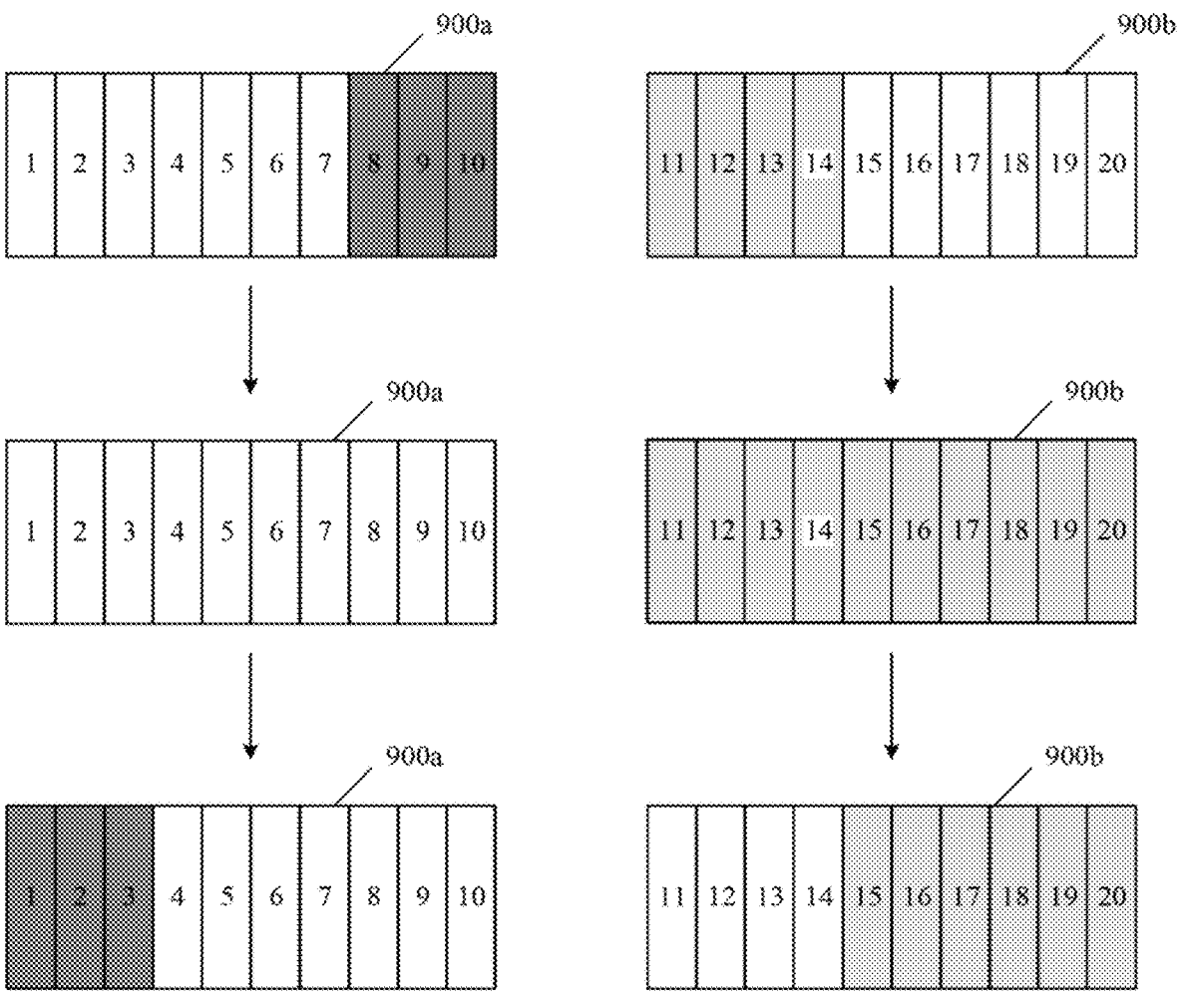
FIG. 9 is a schematic diagram in which statuses of two buffers are changed according to an embodiment of the present disclosure.

For ease of understanding, refer to FIG. 9 together. FIG. 9 is a schematic diagram in which the statuses of the two buffers are changed according to an embodiment of the present disclosure. As shown in FIG. 9, an example in which the first buffer is a buffer 900a and the second buffer is a buffer 900b is used. In this case, a working status of the buffer 900a is the read state. Object image data stored in the buffer 900a may include object image data 1 to object image data 10, which are sequentially represented by reference signs 1, 2, 3, 4, 5, 6, 7, 8, 9, and 10 in FIG. 9. The object image data 1 to the object image data 7 are read data. The object image data 8 to the object image data 10 are to-be-read data. In addition, a working status of the buffer 900b is the storage state. In a process of reading data from the buffer 900a, the target cloud application server may continuously receive object image data and store the object image data to the buffer 900b. In this case, received data in the buffer 900b includes object image data 11 to object image data 14 (there are six remaining spatial positions for receiving object image data in the buffer 900b).

As shown in FIG. 9, when the data in the buffer 900a is completely read (that is, the object image data 7 to the object image data 9 are completely read), the buffer 900a may be cleared. In this case, the received data in the buffer 900b includes the object image data 11 to object image data 20 (sequentially represented by reference signs 11, 12, 13, 14, 15, 16, 17, 18, 19, and 20 in FIG. 9). Further, the working status of the buffer 900a is switched to the storage state, and the working status of the buffer 900b is switched to the read state. Then, the target cloud application server may read data (for example, sequentially read from the object image data 11) from the buffer 900b. In addition, the target cloud application server may synchronously receive object image data and store the object image data to the buffer 900a. For example, new object image data 1 to new object image data 3 are received and stored to the buffer 900a.

It is to be noted that the buffer 900a and the buffer 900b are illustrative examples of no actual reference value for ease of understanding.

In this embodiment of the present disclosure, frame skipping processing of the service server may reduce an image receiving delay of a service server side, and improve image recognition efficiency. Through allocation processing of the two buffers by the target cloud application server, data copying is not required, it is only necessary to switch the working statuses of the two buffers (for example, switch pointers), and buffer allocation is not required to be performed every time. In addition, data reception and data processing (for example, data reading and rendering) may be performed at the same time without waiting, so that the delay may be reduced. That is, the delay may be further reduced by setting the two buffers on the basis of reducing the delay on the service server side.

Figures 10, 11:
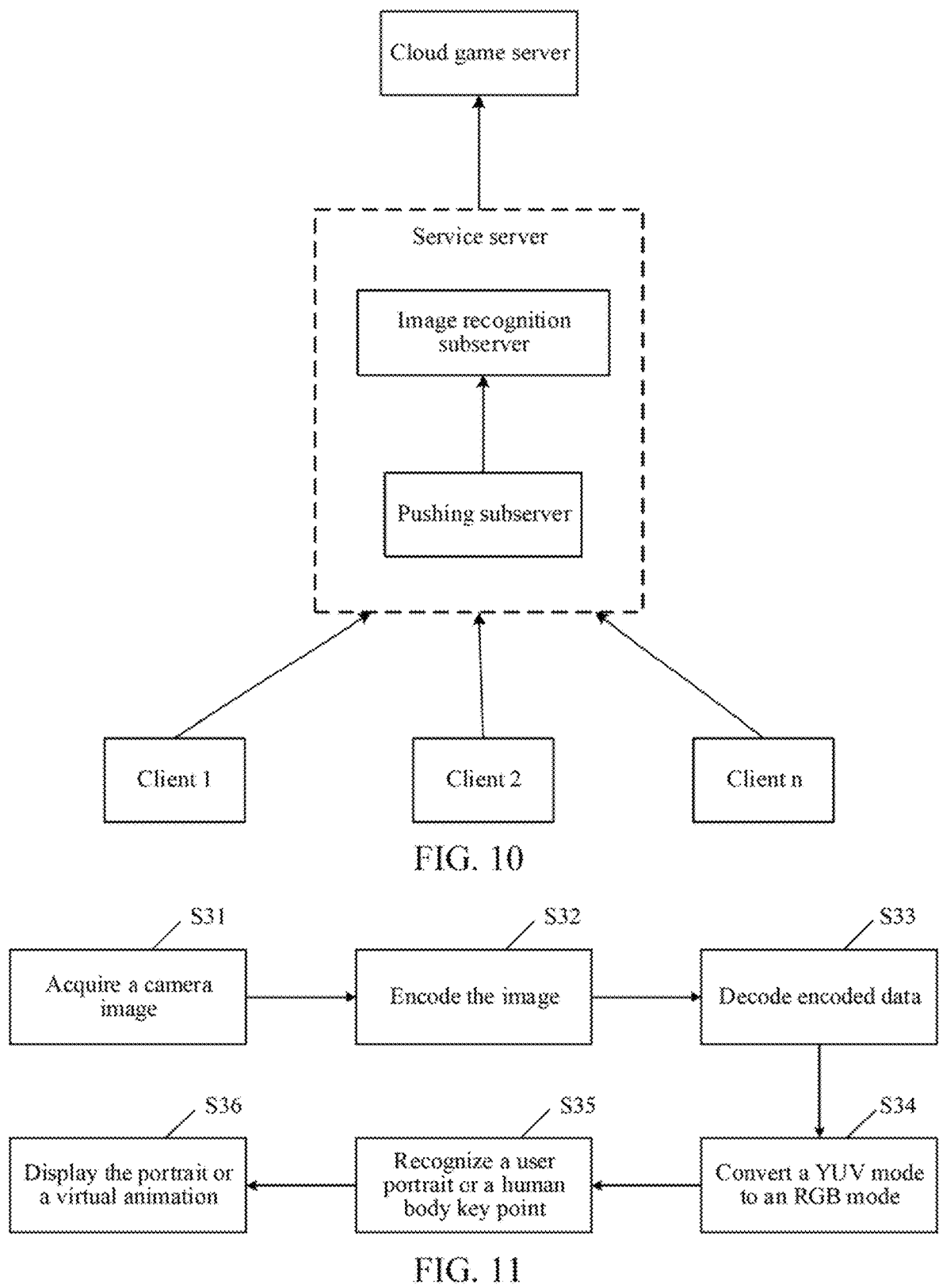
FIG. 10 is a diagram of a system architecture according to an embodiment of the present disclosure.
FIG. 11 is a schematic diagram of a system process according to an embodiment of the present disclosure.

For ease of understanding, refer to FIG. 10 together. FIG. 10 is a diagram of a system architecture according to an embodiment of the present disclosure. The diagram of the system architecture shown in FIG. 10 uses a cloud application as an example. A cloud application server corresponding to the cloud application may be a cloud game server. As shown in FIG. 10, the system architecture may include a client cluster (which may include a client 1, a client 2, . . . , and a client n), a service server (which may include a pushing subserver and an image recognition subserver, where the pushing subserver may be configured to receive an encoded image file uploaded by a client and perform decoding processing on the encoded image file; and the image recognition subserver may perform image recognition processing on decoded image data obtained by the pushing subserver through decoding), and the cloud game server. For ease of understanding, the following makes specific descriptions.

The client cluster: when running the cloud application (for example, a cloud game application), each client may display a picture of the cloud application (for example, a picture of the cloud game application). When the cloud game application is run, a user picture is acquired by using a camera, encoding processing is performed, and obtained image data is uploaded to the pushing subserver in the service server (the pushing subserver may be any server with a data receiving function and a decoding function, and is mainly configured to receive an encoded image file uploaded by the client, and perform decoding processing on the encoded image file).

The pushing subserver: it may receive the image data uploaded by the client and perform decoding processing on the image data to obtain a decoded image in an initial image format (for example, a YUV mode), and may transmit the decoded image to the image recognition subserver.

The image recognition sub-server: it may convert the decoded image from the YUV mode to an RGB mode, then recognize and extract user portrait data or a human body key point in the image, and transmit the user portrait data or the human body key point to the cloud game server. It is to be understood that the pushing subserver and the image recognition subserver may form the service server, such that the service server has image decoding and image recognition functions. Certainly, the pushing subserver and the image recognition subserver may alternatively serve as independent servers to perform corresponding tasks respectively (that is, the pushing subserver receives and decodes the encoded image file, and the image recognition subserver performs image recognition processing on decoded data). It is to be understood that both the pushing subserver and the image recognition subserver may perform frame skipping processing, so as to reduce the data receiving delay.

The cloud game server: the cloud game server may be a cloud application server corresponding to the client. When the client runs the cloud game application, the cloud game server provides a corresponding computing service for the client. The cloud game server may receive the user portrait data or the human body key point, and render the user portrait data. Alternatively, the cloud game server may operate a virtual cartoon doll in the cloud game application by using the human body key point, to implement animation (that is, operate the virtual cartoon doll to synchronize a real action status of the user rather than project the user portrait to the cloud game application).

For ease of understanding, refer to FIG. 11 together. FIG. 11 is a schematic diagram of a system process according to an embodiment of the present disclosure. The process may correspond to the system architecture shown in FIG. 10. As shown in FIG. 11, the process may include S31 to S36:

S31: The client acquires a camera image.

S32: The client encodes the acquired image.

S33: The pushing subserver decodes encoded data.

S34: The image recognition subserver converts a decoded image from the YUV mode into the RGB mode.

S35: The cloud game server recognizes a user portrait or a human body key point.

S36: The portrait or a virtual animation is displayed.

Specific implementations of S31 to S36 may refer to the descriptions in the embodiments corresponding to FIG. 3, FIG. 5, FIG. 7, and FIG. 8, and will not be elaborated herein. Beneficial effects of S31 to S36 will also not be elaborated herein.

It may be understood that when acquiring an object, if the client acquires another object at the same time (it may be understood that another user is in the frame), the client may generate object selection prompt information, and the user selects a final acquisition object. Alternatively, the client automatically determine a final acquisition object according to resolutions and areas of the objects. For example, the client acquires both an object 1 and an object 2. The object 2 is farer away from a camera, and a picture of the object 2 is not so clear. The object 1 is closer to the camera, and a picture of the object 1 is clear. Therefore, the client may automatically determine the object 1 as the final acquisition object.

Figure 12:
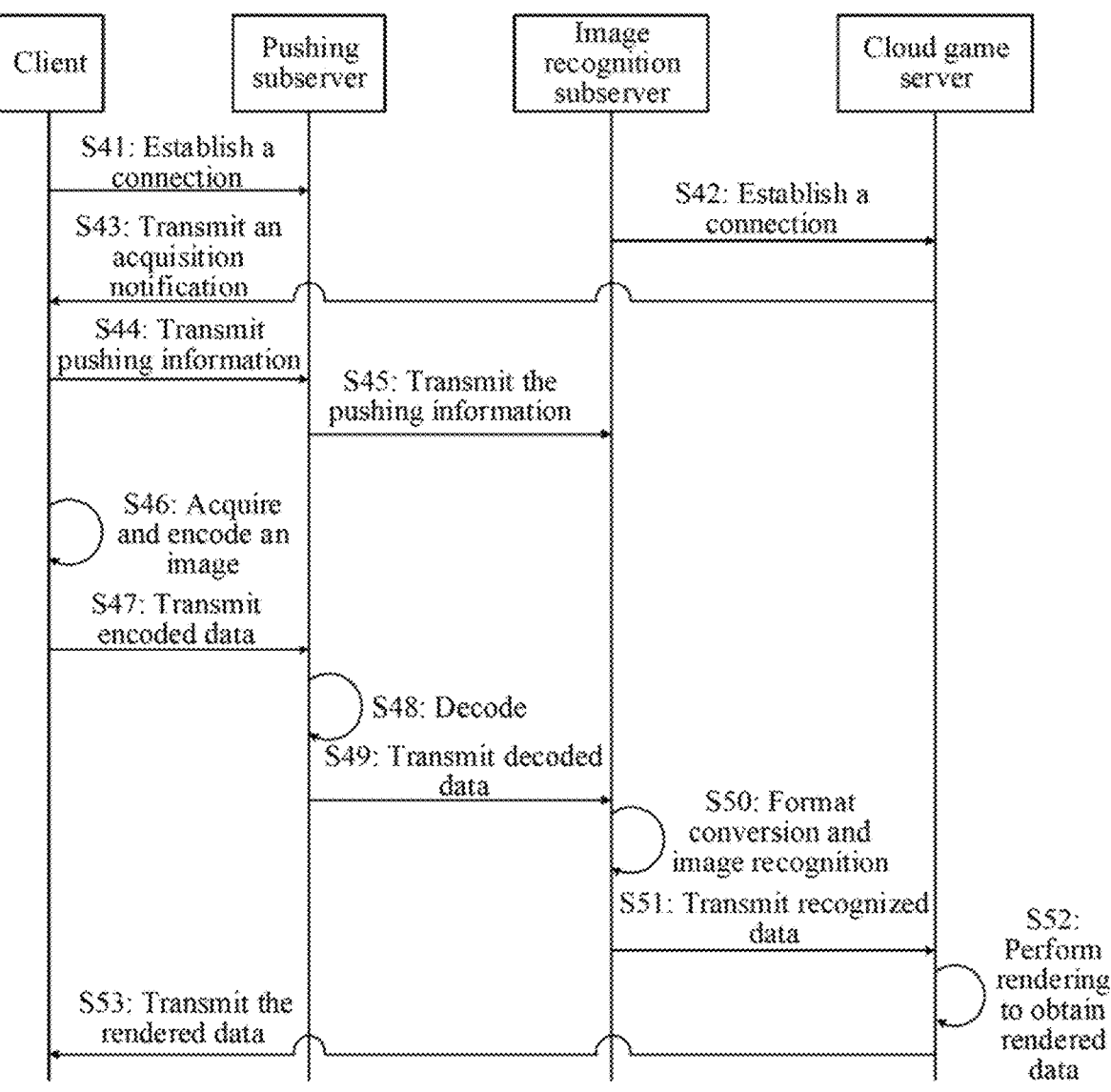
FIG. 12 is a diagram of an interaction process according to an embodiment of the present disclosure.

Refer to FIG. 12. FIG. 12 is a diagram of an interaction process according to an embodiment of the present disclosure. The interaction process may be an interaction process between a client, a pushing subserver, an image recognition subserver, and a cloud application server (taking a cloud game server as an example). As shown in FIG. 12, the interaction process may include at least the following S41 to S54:

S41: The client establishes a connection with the pushing subserver.

When a user opens a cloud game application by using the client, the client may establish the connection (for example, establish a Websocket persistent connection) with the pushing subserver.

S42: The image recognition subserver establishes a connection with the cloud game server.

When the user opens the cloud game application by using the client, the cloud game server (which may be integrated with a cloud game software development kit (SDK)) may establish the connection (for example, establish a TCP connection) with the image recognition sub server.

S43: The cloud game server transmits an acquisition notification to the corresponding client.

The acquisition notification may be a notification message for starting image acquisition.

s44: The Client Transmits a Pushing Message to the Pushing Subserver.

The client may turn on a camera based on the acquisition notification, and notify the pushing subserver of a device identifier of the cloud game server, an identifier of the acquired user, and a width and a height of an image acquired by the camera, such that the pushing subserver is prepared to receive data. The pushing message may include the device identifier of the cloud game server, the identifier of the acquired user, and the width and the height of the image acquired by the camera.

S45: The pushing subserver transmits the pushing message to the image recognition subserver.

After receiving the pushing message of the client, the pushing subserver may establish a TCP connection with the image recognition subserver, and transmit the pushing message to the image recognition subserver.

S46: The client starts image acquisition, and performs encoding.

S47: The client transmits encoded data to the pushing subserver.

S48: The pushing subserver performs decoding to obtain decoded data.

S49: The pushing subserver transmits the decoded data to the image recognition sub server.

S50: The image recognition subserver performs format conversion on the decoded data, and performs image recognition.

S51: The image recognition subserver transmits recognized data to the cloud game server.

S52: The cloud game server renders the recognized data to obtain rendered data.

S53: The cloud game server transmits the rendered data to the client.

Specific implementations of S46 to S53 may refer to the descriptions in the embodiments corresponding to FIG. 3, FIG. 5, FIG. 7, and FIG. 8, and will not be elaborated herein. Beneficial effects of S46 to S53 will also not be elaborated herein.

Figure 13:
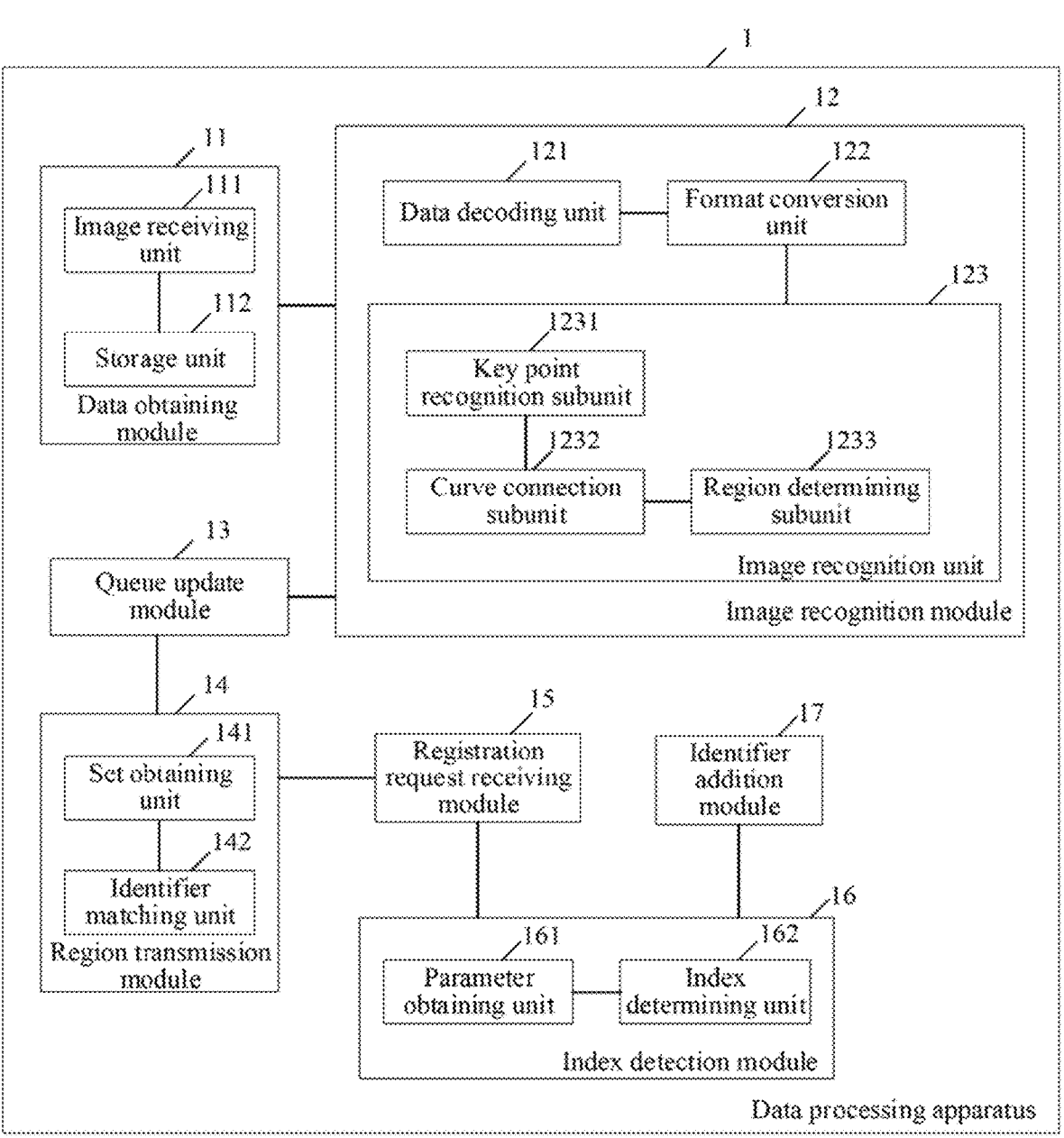
FIG. 13 is a schematic diagram of a structure of a data processing apparatus according to an embodiment of the present disclosure.

Refer to FIG. 13. FIG. 13 is a schematic diagram of a structure of a data processing apparatus according to an embodiment of the present disclosure. The data processing apparatus may be a computer program (including program code) run in a computer device. For example, the data processing apparatus is application software. The data processing apparatus may be configured to perform the method shown in FIG. 3. As shown in FIG. 13, the data processing apparatus 1 may include a data obtaining module 11, an image recognition module 12, a queue update module 13, and a region transmission module 14.

The data obtaining module 11 is configured to obtain first image data transmitted by a first client, and store the first image data to a receive queue. The first image data is image data that is obtained by the first client during running of a cloud application and that includes an object.

The image recognition module 12 is configured to perform image recognition processing on the first image data in the receive queue.

The queue update module 13 is configured to store, to the receive queue during image recognition processing of the first image data, second image data that is continuously obtained and that is transmitted by the first client, to obtain an updated receive queue.

The region transmission module 14 is configured to transmit, when a first object region in which the object is in the first image data is extracted through image recognition processing, first object image data in the first object region to a target cloud application server. The target cloud application server is configured to render the first object image data to obtain rendered data, and transmit the rendered data to the first client.

The region transmission module 14 is further configured to perform image recognition processing synchronously on second image data with a latest receiving timestamp in the updated receive queue.

Specific implementations of the data obtaining module 11, the image recognition module 12, the queue update module 13, and the region transmission module 14 may refer to the descriptions about S101 to S103 in the embodiment corresponding to FIG. 3, and will not be elaborated herein.

In an embodiment, the data obtaining module 11 may include an image receiving unit 111 and a storage unit 112.

The image receiving unit 111 is configured to receive the first image data transmitted by the first client. The first image data is data obtained by the first client by performing encoding processing on an original image frame. The original image frame is acquired by the first client during running of the cloud application.

The storage unit 112 is configured to obtain a receiving timestamp of receiving the first image data, and store the first image data and the receiving timestamp associatively to the receive queue.

Specific implementations of the image receiving unit 111 and the storage unit 112 may refer to the descriptions about S101 to S103 in the embodiment corresponding to FIG. 3, and will not be elaborated herein.

In an embodiment, the image recognition module 12 may include a data decoding unit 121, a format conversion unit 122, and an image recognition unit 123.

The data decoding unit 121 is configured to perform decoding processing on the first image data to obtain decoded image data in an initial image format.

The format conversion unit 122 is configured to perform format conversion on the decoded image data to obtain the original image frame in a standard image format.

The image recognition unit 123 is configured to perform image recognition processing on the original image frame in the standard image format.

Specific implementations of the data decoding unit 121, the format conversion unit 122, and the image recognition unit 123 may refer to the descriptions about S101 in the embodiment corresponding to FIG. 3, and will not be elaborated herein.

In an embodiment, the image recognition unit 123 may include a key point recognition subunit 1231, a curve connection subunit 1232, and a region determining subunit 1233.

The key point recognition subunit 1231 is configured to recognize object edge key points of the object in the original image frame.

The curve connection subunit 1232 is configured to connect the object edge key points to obtain an object edge curve of the object.

The region determining subunit 1233 is configured to determine a region covered by the object edge curve in the original image frame as an initial object region in which the object is in the original image frame, and determine the first object region according to the initial object region.

Specific implementations of the key point recognition subunit 1231, the curve connection subunit 1232, and the region determining subunit 1233 may refer to the descriptions about S102 in the embodiment corresponding to FIG. 3, and will not be elaborated herein.

In an embodiment, the image recognition unit 123 is further configured to: obtain object recognition configuration information for the object and a configured object recognition part indicated by the object recognition configuration information, and match the configured object recognition part with the object key part; and perform, when the configured object recognition part matches the object key part, the operation of determining the first object region according to the initial object region; or determine, when the configured object recognition part does not match the object key part, that the first object region is not extracted through image recognition processing.

In an embodiment, the image recognition unit 123 is further configured to determine image data with an earliest receiving timestamp in the updated receive queue as to-be-recognized image data, and perform image recognition processing on the to-be-recognized image data. When a to-be-processed object region in which the object is in the to-be-recognized image data is extracted through image recognition processing, the region transmission module 14 is further configured to transmit the to-be-processed object region to the target cloud application server.

In an embodiment, the image recognition unit 123 is specifically configured to:

obtain an object key part, presented by the initial object region, of the object; and determine the initial object region as the first object region when the object key part has part completeness; or obtain N sample image frames in a sample database when the object key part does not have part completeness, obtain a to-be-processed sample image frame corresponding to the object from the N sample image frames, and determine the first object region according to the to-be-processed sample image frame and the initial object region, N being a positive integer.

In an embodiment, the image recognition unit 123 is specifically configured to:

obtain overall part information in the to-be-processed sample image frame;

determine a to-be-fused part region in the overall part information according to the object key part; and fuse the to-be-fused part region and the initial object region to obtain the first object region.

In an embodiment, the first image data carries a to-be-confirmed device identifier. The to-be-confirmed device identifier is a device identifier of a bound cloud application server. The bound cloud application server is in a binding relationship with the first client.

The region transmission module 14 includes a set obtaining unit 141 and an identifier matching unit 142.

The set obtaining unit 141 is configured to obtain a stored device identifier set. The stored device identifier set includes M stored device identifiers. One stored device identifier corresponds to one registered cloud application server. M is a positive integer.

The identifier matching unit 142 is configured to determine, when the M stored device identifiers include a stored device identifier matching the to-be-confirmed device identifier, that the bound cloud application server indicated by the to-be-confirmed device identifier is a registered cloud application server, determine the bound cloud application server indicated by the to-be-confirmed device identifier as the target cloud application server, and transmit the first object image data to the target cloud application server.

Specific implementations of the set obtaining unit 141 and the identifier matching unit 142 may refer to the descriptions about S103 in the embodiment corresponding to FIG. 3, and will not be elaborated herein.

In an embodiment, the data processing apparatus 1 may further include a registration request receiving module 15, an index detection module 16, and an identifier addition module 17.

The registration request receiving module 15 is configured to receive a registration request transmitted by a to-be-registered cloud application server. The registration request is generated by the to-be-registered cloud application server after receiving an application starting notification transmitted by a second client. The application starting notification is generated by the second client in response to an application starting operation on the cloud application.

The index detection module 16 is configured to detect device index information of the to-be-registered cloud application server according to the registration request.

The identifier addition module 17 is configured to obtain a to-be-stored device identifier of the to-be-registered cloud application server when the device index information satisfies a processing quality condition, store the to-be-stored device identifier to the stored device identifier set, convert the to-be-registered cloud application server into a registered cloud application server, and convert the to-be-stored device identifier into a stored device identifier.

Specific implementations of the registration request receiving module 15, the index detection module 16, and the identifier addition module 17 may refer to the descriptions about S103 in the embodiment corresponding to FIG. 3, and will not be elaborated herein.

In an embodiment, the device index information includes a network quality parameter and a device version.

The index detection module 16 may include a parameter obtaining unit 161 and an index determining unit 162.

The parameter obtaining unit 161 is configured to obtain the network quality parameter and the device version of the to-be-registered cloud application server according to the registration request.

The index determining unit 162 is configured to determine, when the network quality parameter reaches a parameter threshold and the device version matches a quality standard version, that the device index information satisfies the processing quality condition.

The index determining unit 162 is further configured to determine, when the network quality parameter does not reach a parameter threshold and the device version does not match a quality standard version, that the device index information does not satisfy the processing quality condition.

Specific implementations of the parameter obtaining unit 161 and the index determining unit 162 may refer to the descriptions about S103 in the embodiment corresponding to FIG. 3, and will not be elaborated herein.

In this embodiment of the present disclosure, when obtaining the first image data including the object, a client (for example, the first client) may transmit the first image data to a related computer device (for example, the service server), the service server performs image recognition processing, and the client is not required to perform image recognition locally. In this way, image recognition processing may be performed on the first image data by using the service server with a high computing capability, so that image recognition efficiency and a definition may be improved. In addition, in the present disclosure, the service server may store the received first image data to the receive queue, continuously obtain the second image data synchronously from the first client during image recognition processing of the first image data, and store the second image data to the receive queue to obtain the updated receive queue. That is, in the present disclosure, the service server does not stop receiving the second image data during image recognition processing of the first image data, and may implement image processing and image reception synchronously by using the receive queue. In this way, the image transmission delay may be reduced. Further, when the service server extracts, through image recognition processing, the first object region in which the object is in the first image data, the service server may transmit the first object image data in the first object region to the target cloud application server, and the target cloud application server performs rendering, and transmits the rendered data obtained through rendering to the first client. In this way, displaying may be performed in the cloud application. In addition, after extracting the first object region, the service server may obtain the second image data with the latest receiving timestamp in the receive queue, and continue to process the second image data. It can be seen that in the present disclosure, image data is not recognized one by one according to a time sequence of receiving timestamps, and instead, image data with a latest receiving timestamp is obtained from the receive queue for processing after image recognition processing is performed on specific image data, so that image data recognition efficiency may be improved. In addition, since the image data with the latest receiving timestamp is acquired according to a current behavior of the object, when image recognition and displaying are performed on the image data with the latest receiving timestamp, the current behavior of the object is matched. In summary, according to the present disclosure, the image recognition efficiency may be improved, the image transmission delay may be reduced, and it may be ensured that a virtual behavior of a virtual object displayed in the cloud application matches a current behavior status of the object.

Figure 14:
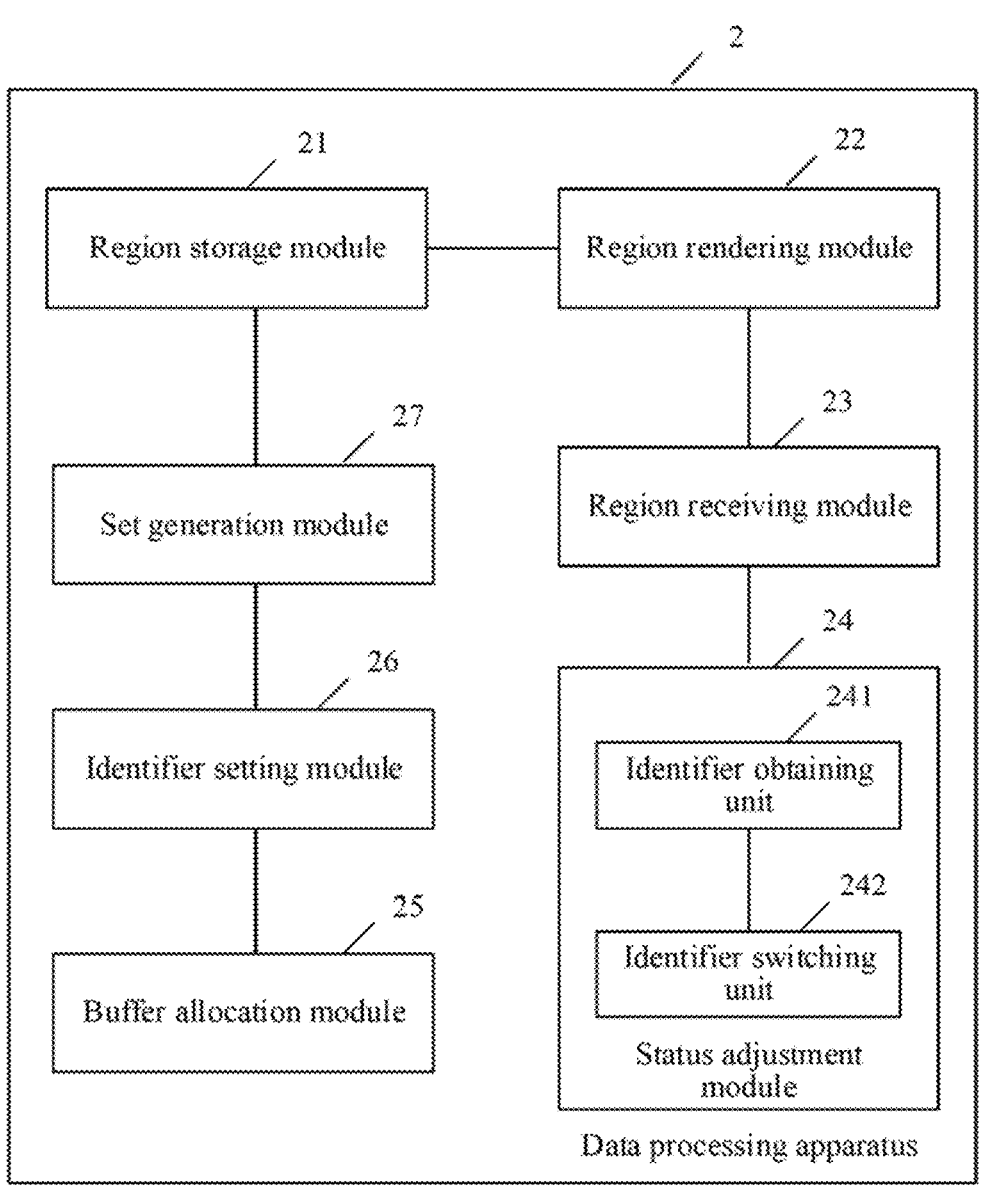
FIG. 14 is a schematic diagram of a structure of another data processing apparatus according to an embodiment of the present disclosure.

Refer to FIG. 14. FIG. 14 is a schematic diagram of a structure of another data processing apparatus according to an embodiment of the present disclosure. The data processing apparatus may be a computer program (including program code) run in a computer device. For example, the data processing apparatus is application software. The data processing apparatus may be configured to perform the method shown in FIG. 8. As shown in FIG. 14, the data processing apparatus 2 may include a region storage module 21, a region rendering module 22, a region receiving module 23, and a status adjustment module 24.

The region storage module 21 is configured to receive first object image data transmitted by a service server, and store the first object image data to a first buffer whose working status is a storage state in a buffer set. The first object image data is image data in a first object region. The first object region is a region, that is obtained after the service server performs image recognition processing on first image data and that an object is in, in the first image data. The first image data is transmitted by a first client to the service server. The first image data is image data that is obtained by the first client during running of a cloud application and that includes the object.

The region rendering module 22 is configured to adjust the working status of the first buffer to a read state when a second buffer whose working status is the read state in the buffer set does not include unprocessed object image data, adjust the working status of the second buffer to the storage state, read the first object region from the first buffer whose working status is the read state, and perform rendering processing on the first object region.

The region receiving module 23 is configured to receive, during rendering of the first object region, second object image data transmitted by the service server, and store the second object image data to the second buffer whose working status is the storage state. The second object image data is image data in a second object region. The second object region is obtained by the service server by performing image recognition processing on second image data after extracting the first object region. The second object region is a region in which the object is in the second image data. The second image data is image data that is obtained by the service server from the receive queue when the first object region is extracted and that has a latest receiving timestamp. Second image data in the receive queue is continuously obtained by the service server from the first client during image recognition processing of the first image data.

The status adjustment module 24 is configured to adjust the working status of the first buffer to the storage state when first rendered data corresponding to the first object image data is obtained, adjust the working status of the second buffer to the read state, read the second object image data from the second buffer whose working status is the read state, and perform rendering processing on the second object image data.

Specific implementations of the region storage module 21, the region rendering module 22, the region receiving module 23, and the status adjustment module 24 may refer to the descriptions about S801 to S804 in the embodiment corresponding to FIG. 8, and will not be elaborated herein.

In an embodiment, the status adjustment module 24 may include an identifier obtaining unit 241 and an identifier switching unit 242.

The identifier obtaining unit 241 is configured to obtain, when first rendered data corresponding to the first object region is obtained, a read pointer identifier that corresponds to the first buffer and that is used for representing the read state and a storage pointer identifier that corresponds to the second buffer and that is used for representing the storage state.

The identifier switching unit 242 is configured to switch the read pointer identifier corresponding to the first buffer to the storage pointer identifier. The working status of the first buffer with the storage pointer identifier is the storage state.

The identifier switching unit 242 is further configured to switch the storage pointer identifier corresponding to the second buffer to the read pointer identifier. The working status of the second buffer with the read pointer identifier is the read state.

Specific implementations of the identifier obtaining unit 241 and the identifier switching unit 242 may refer to the descriptions about S804 in the embodiment corresponding to FIG. 8, and will not be elaborated herein.

In an embodiment, the data processing apparatus 2 may further include a buffer allocation module 25, an identifier setting module 26, and a set generation module 27.

The buffer allocation module 25 is configured to allocate the first buffer and the second buffer.

The identifier setting module 26 is configured to set an initial pointer identifier of the first buffer to be a storage pointer identifier, and set an initial pointer identifier of the second buffer to be a read pointer identifier. The working status of the first buffer with the storage pointer identifier is the storage state. The working status of the second buffer with the read pointer identifier is the read state.

The set generation module 27 is configured to generate the buffer set according to the first buffer whose working status is the storage state and the second buffer whose working status is the read state.

Specific implementations of the buffer allocation module 25, the identifier setting module 26, and the set generation module 27 may refer to the descriptions about S801 in the embodiment corresponding to FIG. 8.

In this embodiment of the present disclosure, frame skipping processing of the service server may reduce an image receiving delay of a service server side, and improve image recognition efficiency. Through allocation processing of the two buffers by the cloud game server, data copying is not required, it is only necessary to switch the working statuses of the two buffers, and buffer allocation is not required to be performed every time. In addition, data reception and data processing (for example, data reading and rendering) may be performed at the same time without waiting, so that the delay may be reduced. That is, the delay may be further reduced by setting the two buffers on the basis of reducing the delay on the service server side.

Figure 15:
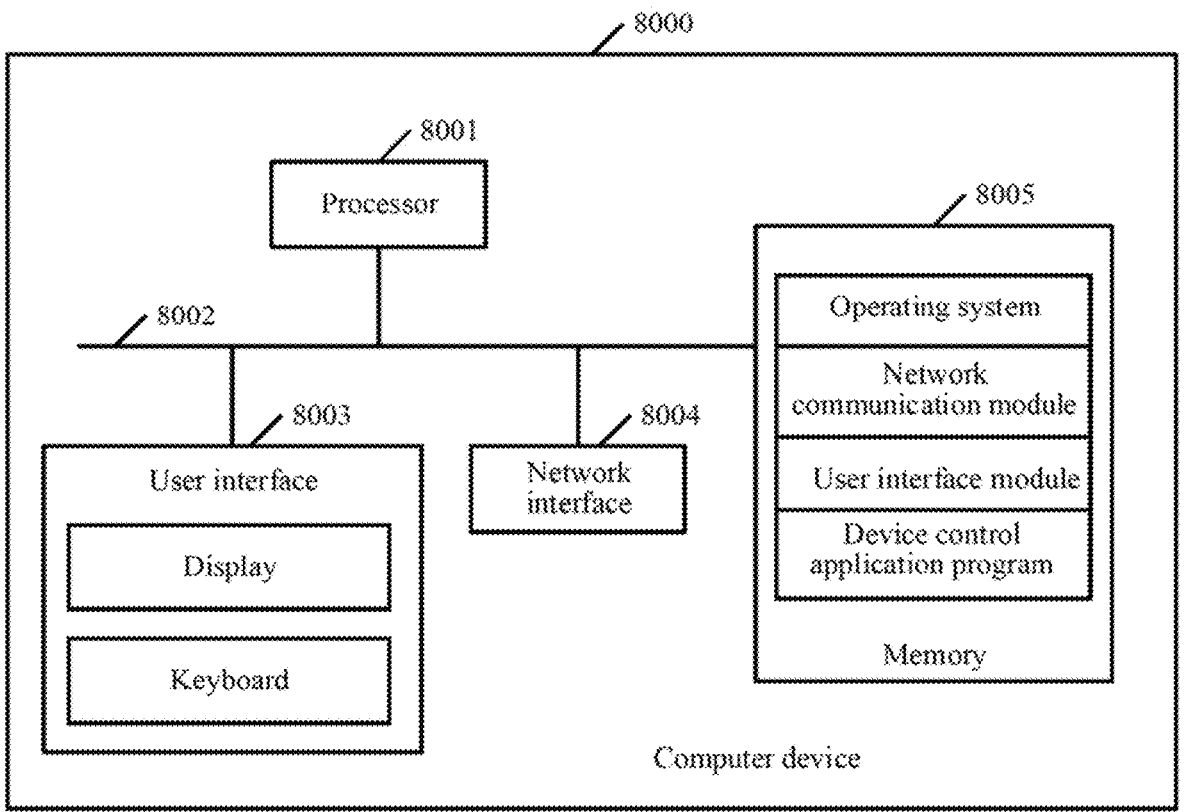
FIG. 15 is a schematic diagram of a structure of a computer device according to an embodiment of the present disclosure.

Refer to FIG. 15. FIG. 15 is a schematic diagram of a structure of a computer device according to an embodiment of the present disclosure. As shown in FIG. 15, the apparatus 1 in the embodiment corresponding to FIG. 13 or the apparatus 2 in the embodiment corresponding to FIG. 14 may be applied to the computer device 8000. The computer device 8000 may include a processor 8001, a network interface 8004, and a memory 8005. In addition, the computer device 8000 further includes a user interface 8003 and at least one communication bus 8002. The communication bus 8002 is configured to implement connection communication between these components. The user interface 8003 may include a display and a keyboard. In some embodiments, the user interface 8003 may further include a standard wired interface and wireless interface. In some embodiments, the network interface 8004 may include a standard wired interface and wireless interface (for example, a wireless fidelity (Wi-Fi interface)). The memory 8005 may be a high-speed random access memory (RAM), or a non-volatile memory, for example, at least one disk memory. In some embodiments, the memory 8005 may be at least one storage apparatus far away from the processor 8001. As shown in FIG. 15, as a computer-readable storage medium, the memory 8005 may include an operating system, a network communication module, a user interface module, and a device control application program.

In the computer device 8000 shown in FIG. 15, the network interface 8004 may provide a network communication function. The user interface 8003 is mainly configured to provide an input interface for a user. The processor 8001 may be configured to call the device control application program stored in the memory 8005 to implement the data processing method provided in the foregoing embodiment.

It is to be understood that the computer device 8000 described in this embodiment of the present disclosure may execute the descriptions about the data processing methods in the embodiments corresponding to FIG. 3 to FIG. 8, or may execute the descriptions about the data processing apparatus 1 in the embodiment corresponding to FIG. 13 or the data processing apparatus 2 in the embodiment corresponding to FIG. 14. Elaborations are omitted herein. In addition, the description of beneficial effects of the same method are not described herein again.

Further, an embodiment of the present disclosure also provides a computer-readable storage medium. The computer-readable storage medium stores a computer program executed by the data processing computer device 8000 mentioned above. The computer program includes program instructions. The processor, when executing the program instructions, may execute the descriptions about the data processing methods in the embodiments corresponding to FIG. 3 to FIG. 8. Therefore, elaborations are omitted herein. In addition, the description of beneficial effects of the same method are not described herein again. Technical details that are not disclosed in the embodiment of the computer-readable storage medium involved in the present disclosure refer to the descriptions in the method embodiments of the present disclosure.

The computer-readable storage medium may be an internal storage unit of the data processing apparatus or the computer device provided in any one of the foregoing embodiments, for example, a hard disk or internal memory of the computer device. The computer-readable storage medium may alternatively be an external storage device of the computer device, for example, a plug-in hard disk, a smart media card (SMC), a secure digital (SD) card, or a flash card on the computer device. Further, the computer-readable storage medium may alternatively include both an internal storage unit and an external storage device of the computer device. The computer-readable storage medium is configured to store the computer program and another program and data that are required by the computer device. The computer-readable storage medium may further be configured to temporarily store data that has been output or is to be output.

An aspect of the present disclosure provides a computer program product or computer program. The computer program product or computer program includes computer instructions. The computer instructions are stored in a computer-readable storage medium. A processor of a computer device reads the computer instructions from the computer-readable storage medium. The processor executes the computer instructions to enable the computer device to perform the method provided in an aspect of the embodiments of the present disclosure.

Terms "first", "second", and the like in the description, the claims, and the drawings in the embodiments of the present disclosure are used to distinguish between different objects rather than describe a specific sequence. In addition, term "include" and any variation thereof are intended to cover nonexclusive inclusions. For example, a process, method, apparatus, product, or device including a series of steps or units is not limited to the listed steps or modules, but may further include steps or modules that are not listed, or may further include other steps or units that are intrinsic to the process, the method, the apparatus, the product, or the device.

A person of ordinary skill in the art may further realize that the units and the algorithm steps in each example described with reference to the embodiments disclosed herein may be implemented by electronic hardware, computer software, or a combination thereof. For clarity of description about the exchangeability of hardware and software, the compositions and the steps in each example have been generally described in the foregoing description according to functions. Whether these functions are executed by hardware or software depends on specific applications and design constraints of the technical solutions. A person skilled in the art may use different methods to implement the described functions for each particular application, but it should not be considered that the implementation goes beyond the scope of the present disclosure.

The method and the related apparatus provided in the embodiments of the present disclosure are described with reference to the flowchart of the method and/or the schematic diagram of the structure provided in the embodiments of the present disclosure. Specifically, each process and/or box in the flowchart of the method and/or the schematic diagram of the structure and a combination of the processes and/or boxes in the flowchart and/or the block diagram may be implemented by computer program instructions. These computer program instructions may be provided for a general-purpose computer, a special-purpose computer, an embedded processor, or a processor of another programmable data processing device to generate a machine, so that an apparatus configured to realize functions specified in one or more processes in the flowchart and/or one or more boxes in the schematic diagram of the structure is generated by the instructions executed by the general-purpose computer or the processor of the another programmable data processing device. Alternatively, these computer program instructions may be stored in a computer-readable memory capable of guiding a computer or another programmable data processing device to work in a specific manner, so that a product including an instruction apparatus may be generated by the instructions stored in the computer-readable memory, the instruction apparatus realizing functions specified in one or more processes in the flowchart and/or one or more boxes in the schematic diagram of the structure. Alternatively, these computer program instructions may be loaded onto a computer or another programmable data processing device, so that a series of operating steps are executed in the computer or the another programmable data processing device to generate processing implemented by the computer, and steps for realizing functions specified in one or more processes in the flowchart and/or one or more boxes in the schematic diagram of the structure are provided by the instructions executed on the computer or the another programmable data processing device.

The above is only the preferred embodiment of the present disclosure and certainly not intended to limit the scope of the present disclosure. Therefore, equivalent variations made according to the claims of the present disclosure also fall within the scope of the present disclosure.

What is claimed is:

1. A data processing method, the method being performed by a service server, and the method comprising:

receiving, by the service server, first image data transmitted by a first client executing a cloud application, and storing the first image data to a receive queue, the first image data being obtained by the first client during running of a cloud application and comprises an object, wherein the service server is independent from the first client, the first client is bound with a first cloud application server, and the first image data carries a first device identifier of the first cloud application server, performing image recognition processing on the first image data in the receive queue, and storing, to the receive queue during image recognition processing of the first image data, second image data obtained and transmitted by the first client, to obtain an updated receive queue;

obtaining a stored device identifier set, the stored device identifier set comprising M stored device identifiers of M cloud application servers, each stored device identifier corresponding to one registered cloud application server, and M being a positive integer, wherein the service server is independent from the M cloud application servers;

determining, in response to the first device identifier matching one of the M stored device identifiers, that the first cloud application server indicated by the first device identifier is a registered cloud application server; and transmitting, in response to determining that the first cloud application server is the registered cloud application server and that a first object region containing the object in the first image data is extracted through image recognition processing, first object image data in the first object region to the first cloud application server, and simultaneously performing image recognition processing on the second image data with a latest receiving timestamp in the updated receive queue, the first cloud application server being configured to render the first object image data to obtain rendered data, and transmit the rendered data to the cloud application executed on the first client.

2. The method according to claim 1, wherein the obtaining first image data transmitted by a first client and storing the first image data to a receive queue comprises:

receiving the first image data transmitted by the first client, the first image data obtained by the first client by performing encoding processing on an original image frame, and the original image frame being acquired by the first client during running of the cloud application; and obtaining a receiving timestamp of receiving the first image data, and storing the first image data and the receiving timestamp associatively to the receive queue.

3. The method according to claim 2, wherein the performing image recognition processing on the first image data in the receive queue comprises:

performing decoding processing on the first image data to obtain decoded image data in an initial image format;

performing format conversion on the decoded image data to obtain the original image frame in a standard image format; and performing image recognition processing on the original image frame in the standard image format.

4. The method according to claim 3, wherein the performing image recognition processing on the original image frame in the standard image format comprises:

recognizing object edge key points of the object in the original image frame;

connecting the object edge key points to obtain an object edge curve of the object;

determining a region covered by the object edge curve in the original image frame as an initial object region containing the object in the original image frame; and determining the first object region according to the initial object region.

5. The method according to claim 4, further comprising:

obtaining an object key part, presented by the initial object region, of the object;

obtaining object recognition configuration information for the object and a configured object recognition part indicated by the object recognition configuration information, and matching the configured object recognition part with the object key part; and performing, when the configured object recognition part matches the object key part, the operation of determining the first object region according to the initial object region; or determining, when the configured object recognition part does not match the object key part, that the first object region is not extracted through image recognition processing.

6. The method according to claim 5, further comprising:

determining image data with an earliest receiving timestamp in the updated receive queue as image data to be recognized; and performing image recognition processing on the image data, and transmitting, when an object region containing the object in the image data is extracted through image recognition processing, the object region to the target cloud application server.

7. The method according to claim 4, wherein the determining the first object region according to the initial object region comprises:

obtaining an object key part, presented by the initial object region, of the object; and determining the initial object region as the first object region when the object key part has part completeness; or obtaining N sample image frames in a sample database when the object key part does not have part completeness, obtaining a sample image frame corresponding to the object from the N sample image frames, and determining the first object region according to the sample image frame and the initial object region, N being a positive integer.

8. The method according to claim 7, wherein the determining the first object region according to the sample image frame and the initial object region comprises:

obtaining overall part information in the sample image frame;

determining a part region to be fused in the overall part information according to the object key part; and fusing the part region and the initial object region to obtain the first object region.

9. The method according to claim 1, wherein the method further comprises:

receiving a registration request transmitted by a cloud application server to be registered, the registration request being generated by the cloud application server after receiving an application starting notification transmitted by a second client, and the application starting notification being generated by the second client in response to an application starting operation on the cloud application;

detecting device index information of the cloud application server according to the registration request; and obtaining a device identifier of the cloud application server when the device index information satisfies a processing quality condition, storing the device identifier to the stored device identifier set, determining the cloud application server as a registered cloud application server, and determining the device identifier as a stored device identifier.

10. The method according to claim 9, wherein the device index information comprises a network quality parameter and a device version; and the detecting device index information of the cloud application server according to the registration request comprises:

obtaining the network quality parameter and the device version of the cloud application server according to the registration request; and determining, when the network quality parameter reaches a parameter threshold and the device version matches a quality standard version, that the device index information satisfies the processing quality condition; or determining, when the network quality parameter does not reach a parameter threshold and the device version does not match a quality standard version, that the device index information does not satisfy the processing quality condition.

11. The method according to claim 1, wherein the performing image recognition processing on second image data with a latest receiving timestamp in the updated receive queue comprises:

obtaining the second image data with the latest receiving timestamp in the updated receive queue; and performing image recognition processing on the second image data, and deleting historical image data in the updated receive queue simultaneously, the historical image data being image data whose receiving timestamp is earlier than that of the second image data in the updated receive queue.

12. A service server, comprising: at least one processor, and at least one memory configured to store a program code, the at least one processor being configured to execute the program code and perform:

receiving first image data transmitted by a first client executing a cloud application, and storing the first image data to a receive queue, the first image data being obtained by the first client during running of a cloud application and comprises an object, wherein the service server is independent from the first client, the first client is bound with a first cloud application server, and the first image data carries a first device identifier of the first cloud application server;

performing image recognition processing on the first image data in the receive queue, and storing, to the receive queue during image recognition processing of the first image data, second image data obtained and transmitted by the first client, to obtain an updated receive queue;

obtaining a stored device identifier set, the stored device identifier set comprising M stored device identifiers of M cloud application servers, each stored device identifier corresponding to one registered cloud application server, and M being a positive integer, wherein the service server is independent from the M cloud application servers;

determining, in response to the first device identifier matching one of the M stored device identifiers, that the first cloud application server indicated by the first device identifier is a registered cloud application server; and transmitting, in response to determining that the first cloud application server is the registered cloud application server and that a first object region containing the object in the first image data is extracted through image recognition processing, first object image data in the first object region to the first cloud application server, and simultaneously performing image recognition processing on the second image data with a latest receiving timestamp in the updated receive queue, the first cloud application server being configured to render the first object image data to obtain rendered data, and transmit the rendered data to the cloud application executed on the first client.

13. The device according to claim 12, wherein the obtaining first image data transmitted by a first client and storing the first image data to a receive queue comprises:

receiving the first image data transmitted by the first client, the first image data obtained by the first client by performing encoding processing on an original image frame, and the original image frame being acquired by the first client during running of the cloud application; and obtaining a receiving timestamp of receiving the first image data, and storing the first image data and the receiving timestamp associatively to the receive queue.

14. The device according to claim 13, wherein the performing image recognition processing on the first image data in the receive queue comprises:

performing decoding processing on the first image data to obtain decoded image data in an initial image format;

performing format conversion on the decoded image data to obtain the original image frame in a standard image format; and performing image recognition processing on the original image frame in the standard image format.

15. The device according to claim 14, wherein the performing image recognition processing on the original image frame in the standard image format comprises:

recognizing object edge key points of the object in the original image frame;

connecting the object edge key points to obtain an object edge curve of the object;

determining a region covered by the object edge curve in the original image frame as an initial object region containing the object in the original image frame; and determining the first object region according to the initial object region.

16. The device according to claim 15, wherein the at least one processor is further configured to perform:

obtaining an object key part, presented by the initial object region, of the object;

obtaining object recognition configuration information for the object and a configured object recognition part indicated by the object recognition configuration information, and matching the configured object recognition part with the object key part; and performing, when the configured object recognition part matches the object key part, the operation of determining the first object region according to the initial object region; or determining, when the configured object recognition part does not match the object key part, that the first object region is not extracted through image recognition processing.

17. The device according to claim 16, wherein the at least one processor is further configured to perform:

determining image data with an earliest receiving timestamp in the updated receive queue as image data to be recognized; and performing image recognition processing on the image data, and transmitting, when an object region containing the object in the image data is extracted through image recognition processing, the object region to the target cloud application server.

18. The device according to claim 15, wherein the determining the first object region according to the initial object region comprises:

obtaining an object key part, presented by the initial object region, of the object; and determining the initial object region as the first object region when the object key part has part completeness; or obtaining N sample image frames in a sample database when the object key part does not have part completeness, obtaining a sample image frame corresponding to the object from the N sample image frames, and determining the first object region according to the sample image frame and the initial object region, N being a positive integer.

19. A non-transitory computer-readable storage medium, storing a computer program, and the computer program, when loaded and executed by at least one processor of a service server, causing the at least one processor to perform:

receiving first image data transmitted by a first client executing a cloud application, and storing the first image data to a receive queue, the first image data being obtained by the first client during running of a cloud application and comprises an object, wherein the service server is independent from the first client, the first client is bound with a first cloud application server, and the first image data carries a first device identifier of the first cloud application server;

performing image recognition processing on the first image data in the receive queue, and storing, to the receive queue during image recognition processing of the first image data, second image data obtained and transmitted by the first client, to obtain an updated receive queue;

obtaining a stored device identifier set, the stored device identifier set comprising M stored device identifiers of M cloud application servers, each stored device identifier corresponding to one registered cloud application server, and M being a positive integer, wherein the service server is independent from the M cloud application servers;

determining, in response to the first device identifier matching one of the M stored device identifiers, that the first cloud application server indicated by the first device identifier is a registered cloud application server; and transmitting, in response to determining that the first cloud application server is the registered cloud application server and that a first object region containing the object in the first image data is extracted through image recognition processing, first object image data in the first object region to the first cloud application server, and simultaneously performing image recognition processing on the second image data with a latest receiving timestamp in the updated receive queue, the first cloud application server being configured to render the first object image data to obtain rendered data, and transmit the rendered data to the cloud application executed on the first client.

20. The method according to claim 1, further comprising:

receiving a registration request transmitted by the first cloud application server in response to the first client running the cloud application for a first time; and adding the first device identifier corresponding to the first cloud application server to the stored device identifier set.

* * * * *